US010935449B2

(12) United States Patent
Barta et al.

(10) Patent No.: US 10,935,449 B2
(45) Date of Patent: Mar. 2, 2021

(54) DUAL FUEL COMBUSTION INTENSITY

(71) Applicant: WOODWARD, INC., Fort Collins, CO (US)

(72) Inventors: Jason Barta, Fort Collins, CO (US); Gregory James Hampson, Boulder, CO (US); Suraj Nair, Fort Collins, CO (US); Jeffrey Carlson, Denver, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/971,957

(22) Filed: May 4, 2018

(65) Prior Publication Data

US 2018/0321105 A1 Nov. 8, 2018

Related U.S. Application Data

(60) Provisional application No. 62/502,285, filed on May 5, 2017.

(51) Int. Cl.
*G01L 23/22* (2006.01)
*F02D 19/06* (2006.01)
(Continued)

(52) U.S. Cl.
CPC .......... *G01L 23/222* (2013.01); *F02B 77/085* (2013.01); *F02D 19/0623* (2013.01);
(Continued)

(58) Field of Classification Search
None
See application file for complete search history.

(56) References Cited

U.S. PATENT DOCUMENTS 9,228,506 B2 1/2016 Gokhale et al.
2011/0010074 A1 1/2011 Hung et al.
(Continued)

FOREIGN PATENT DOCUMENTS

EP 0647774 4/1995
EP 2020496 A2 2/2009
WO WO2017112967 A1 7/2017

OTHER PUBLICATIONS

Kuratle, Rolf H., and Balz Märki. "Influencing Parameters and Error Sources during Indication on Internal Combustion Engines." SAE Transactions, vol. 101, 1992, pp. 295-303. JSTOR, www.jstor.org/stable/44611215. Accessed Apr. 13, 2020. (p. 295 provided). (Year: 1992).*

(Continued)

*Primary Examiner* — Paul M. West
*Assistant Examiner* — Mark A Shabman
(74) *Attorney, Agent, or Firm* — Fish & Richardson P.C.

(57) ABSTRACT

A method of detecting uncontrolled combustion in an internal combustion engine includes sampling in-cylinder pressure sensor configured to measure pressure in a cylinder of the engine and generate a pressure signal, calculating a combustion intensity metric based on the pressure signal, determining a parameter describing how close the engine is to an uncontrolled combustion condition based on the combustion intensity metric, and controlling a substitution rate of a first fuel and a second fuel based on one or more of the parameter and the combustion intensity metric.

18 Claims, 15 Drawing Sheets

(51) Int. Cl.
*F02D 19/08* (2006.01)
*F02D 35/02* (2006.01)
*F02D 41/00* (2006.01)
*F02D 41/22* (2006.01)
*F02D 41/30* (2006.01)
*F02D 19/10* (2006.01)
*F02B 77/08* (2006.01)

(52) U.S. Cl.
CPC ........... *F02D 19/081* (2013.01); *F02D 19/10* (2013.01); *F02D 35/023* (2013.01); *F02D 41/0025* (2013.01); *F02D 41/0027* (2013.01); *F02D 41/22* (2013.01); *F02D 41/3047* (2013.01); *G01L 23/22* (2013.01); *F02D 19/0647* (2013.01); *F02D 2200/0404* (2013.01); *F02D 2200/0614* (2013.01)

(56) References Cited

U.S. PATENT DOCUMENTS

| | | |
|---|---|---|
| 2012/0016567 A1 | 1/2012 | Delpech |
| 2015/0219027 A1* | 8/2015 | zur Loye ............ F02D 41/0027 60/603 |
| 2016/0305351 A1 | 10/2016 | Barta et al. |
| 2017/0342916 A1 | 11/2017 | Jung et al. |

OTHER PUBLICATIONS

PCT International Search Report and Written Opinion of the International Searching Authority in International Application No. PCT/US2018/031248, dated Aug. 8, 2018, 16 pages.
International Preliminary Report on Patentability in International Application No. PCT/US2018/031248, dated Nov. 14, 2019, 10 pages.
Barta et al., "Real-time Combustion Diagnostics and Control for Improved Engine Management", MTZ Industrial, 2016, 6(1):26-31.
Draper, C.S., "Pressure Waves Accompanying Detonation in the Internal Combustion Engine", Journal of the Aeronautical Sciences, Apr. 1938, 5(6)219-226.
European Communication Pursuant to Article 94(3) EPC in EP Appln. No. 18729826.0, dated Sep. 9, 2020, 6 pages.
Heywood, JB., "Internal Combustion Engine Fundamentals", McGraw-Hill, 1988, 9 pages.
Hockett et al., "An experimental and multi-dimensional computational study on uncontrolled combustion rates in a light duty natural gas/diesel dual fuel engine", Combustion Science and Technology, 2015.
Hockett et al., "Development and Validation of a Reduced Chemical Kinetic Mechanism for CFD Simulations of Natural Gas/Diesel Dual Fuel Engines", Energy & Fuels, Jan. 2016, 52 pages.
Hockett, Andrew., "A Computational and Experimental Study on Combustion Processes in Natural Gas/Diesel Dual Fuel Engines", Diss. Colorado State University, Libraries, 2015, 249 pages.
Nair et al., "Performance Comparison of Vibration Knock Sensors and In-Cylinder Pressure for Protection of Gas and Dual Fuel Engines", 10th Dessau Gas Engine Conference, 2017, 13 pages.

* cited by examiner

DUAL FUEL COMBUSTION INTENSITY

BACKGROUND

Uncontrolled, damaging combustion such as engine knock, in which a large amount of energy is released in a short period of time, typically from rapid combustion of end gas, creates rapid pressure rise rates often followed by high frequency pressure oscillations. These intense pressure waves impose high stresses on engine structural components, and dramatically increase heat transfer rates, ultimately leading to engine damage. Such uncontrolled combustion may occur due to a variety of reasons such as poor fuel quality and properties, inhomogeneity of fuel-air mixture, hot spots in the combustion chamber, deposits, evaporating lube oil, unfavorable pressure-time history in the unburned gas of the cylinder charge, cylinder or cyclic variability of charge, inadequate cooling etc. Prediction of abnormal combustion is generally very difficult and is typically addressed during engine design.

SUMMARY

The concepts herein encompass the inclusion of at least one in-cylinder pressure sensor on the engine with the following combustion metrics being calculated concurrently with operation of the engine, and in some instances, in real-time: Peak Pressure, Rate of Pressure Rise, Pressure Ripple, Burn Duration, and Change Rate of Heat Release. These metrics are then combined mathematically via an equation/algorithm to determine how close the engine is operating to uncontrolled combustion. This allows the engine to be pushed to more severe operating conditions such as a richer mixture or higher substitution rates in Dual Fuel operation while maintaining safe operation. In some instances, the engine is a 2-stroke or 4-stroke engine and, in some instances, real-time refers to combustion metrics being calculated before completion of the next cycle, within the same cycle (e.g., before the next intake), before completion of the next stroke, or within the same stroke.

In some implementations, the concepts herein include ability to collect and process in-cylinder pressure information on a cycle-to-cycle basis as well as the following algorithms:

Peak Pressure—The maximum combustion pressure during one event

Rate of Pressure Rise—the maximum rate of pressure rise during combustion

Pressure Ripple—Summation of the delta P

Burn Duration—Crank Angle degrees between CAx1 and CAx2

Heat Release Change—Determination of the first half combustion process compared to the second half of the combustion process Certain aspects of the present disclosure include using the combustion metrics listed above to determine a combustion intensity number that can then be used in a control loop to drive the engine safely to maximum gas substitution. In some implementations, all of these metrics are needed in order to cover many different cases that can be seen on a dual fuel engine. In some instances, the heat release change is statically determined or dynamically determined such that the inflection point of where combustion speeds up is accurately determined.

In certain aspects of the present disclosure, uncontrolled combustion (detonation) is no longer looked at from the traditional time based frequency domain, but instead from low speed direct in-cylinder pressure information which is based on practical engine limits.

One example of the present disclosure is method of detecting uncontrolled combustion in an internal combustion engine. The method includes sampling in-cylinder pressure sensor configured to measure pressure in a cylinder of the engine and generate a corresponding pressure signal, calculating a combustion intensity metric based on the corresponding pressure signal, and determining a parameter describing how close the engine is to an uncontrolled combustion condition based on the combustion intensity metric.

Another example is a dual-fuel internal combustion engine including an in-cylinder pressure sensor configured to measure the pressure in a cylinder of the engine and generate a corresponding pressure signal, a crank angle sensor configured to measure the crank angle of the engine and generate a corresponding crank angle signal, and an engine control unit countable to the pressure sensor and the crank angle sensor. The engine control unit is configured to: sample the pressure signal, calculate a combustion intensity metric based on the corresponding pressure signal, determine a parameter describing how close the engine is to an uncontrolled combustion condition; and control a substitution rate of a first fuel and a second fuel delivered to the cylinder based on one or more of the parameter and the combustion intensity metric.

Another example is a method of detecting uncontrolled combustion in an internal combustion engine. The method includes sampling a pressure signal from in-cylinder pressure sensor, the pressure signal representative of a measured pressure in a cylinder of the engine, calculating a combustion intensity metric based on the pressure signal, wherein the combustion intensity metric is an indicator of the engine's proximity to an uncontrolled combustion condition, determining an engine control parameter as a function of the combustion intensity metric, and controlling the engine based on the engine control parameter.

In some instances, the internal combustion engine includes a dual-fuel internal combustion engine and the engine control parameter includes a substitution rate of a first fuel and a second fuel based on at least one of the parameter or the combustion intensity metric.

In some instances, the first fuel is diesel and wherein the second fuel is natural gas.

In some instances, the combustion intensity metric is calculated within a same combustion cycle as the sampling of the in-cylinder pressure sensor.

In some instances, the method includes calculating, based on the pressure signal, a pressure metric, a heat release metric, and a knock metric, where the combustion intensity metric a function of the pressure metric, the heat release metric, and the knock metric. In some instances, the heat release metric comprises an adiabatic heat release rate of combustion in a cylinder of the engine.

In some instances, the method includes calculating at least one of the following combustion metrics based on the pressure signal: the peak cylinder pressure, the crank angle of peak cylinder pressure, a rate of cylinder pressure rise, a cylinder pressure ripple, the crank angle of a cylinder pressure ripple, a burn duration, a slope of heat release, the crank angle of centroid of heat release, or the crank angle of max heat release rate.

In some instances, the combustion intensity metric is a function of at least one of: the peak cylinder pressure, the crank angle of peak cylinder pressure, the rate of cylinder pressure rise, the cylinder pressure ripple, the crank angle of cylinder ripple, the burn duration, the slope of heat release, the crank angel of centroid of heat release, or the crank angle of max heat release rate.

In some instances, the combustion intensity metric is a function of at least the peak pressure, the rate of pressure rise, the pressure ripple, the burn duration, and the slope of heat release.

In some instances, the method includes determining a fuel input signal, a throttle position signal, and an ignition timing signal for the engine based on at least one of the combustion intensity metric or the parameter.

Yet another example is a controller controlling operation of a dual-fuel internal combustion engine of an engine system, where the engine system includes a pressure sensor configured to measure pressure in a cylinder of the engine and generate a corresponding pressure signal and a crank angle sensor configured to measure the crank angle of the engine and generate a corresponding crank angle signal. The controller includes a processor couplable to the in-pressure sensor and the crank angle sensor and at least one non-transitory computer readable medium storing instructions operable to cause the processor of the controller to perform operations. Where the operations include: (a) sample the pressure signal, (b) calculate a combustion intensity metric based on the pressure signal, wherein the combustion intensity metric is an indicator of the engine's proximity to an uncontrolled combustion condition, (c) determine a substitution rate of a first fuel and a second fuel delivered to the cylinder based on the combustion intensity metric, and (d) control the dual-fuel internal combustion engine based on the substitution rate.

In some instances, first fuel is diesel and wherein the second fuel is natural gas.

In some instances, steps (b) and (c) occur within a next cycle of the cylinder.

In some instances, the instructions include calculating, based on the pressure signal, a pressure metric, a heat release metric, and a knock metric, and wherein the combustion intensity metric a function of the pressure metric, the heat release metric, and the knock metric.

In some instances, calculating the heat release metric includes calculating an adiabatic heat release rate of combustion in the cylinder of the engine.

In some instances, the instructions include calculating at least one of the following combustion metrics based on the pressure signal: the peak cylinder pressure, the crank angle of peak cylinder pressure, a rate of cylinder pressure rise, a cylinder pressure ripple, the crank angle of a cylinder pressure ripple, a burn duration, a slope of heat release, the crank angle of centroid of heat release, or the crank angle of max heat release rate.

In some instances, the peak cylinder pressure, the crank angle of peak cylinder pressure, the rate of cylinder pressure rise, the cylinder pressure ripple, the crank angle of cylinder ripple, the burn duration, the slope of heat release, the crank angel of centroid of heat release, or the crank angle of max heat release rate.

In some instances, the combustion intensity metric is a function of at least the peak pressure, the rate of pressure rise, the pressure ripple, the burn duration, and the slope of heat release.

In some instances, the instructions include determine at least one of: a fuel input signal, a throttle position signal, or an ignition timing signal for the dual-fuel internal combustion engine based on at least one of the combustion intensity metric or the parameter, and control the dual-fuel internal combustion engine using at least one of: the fuel input signal, the throttle position signal, or the ignition timing signal.

Yet another example is controller for controlling operation of an internal combustion engine of an engine system, where the engine system includes a pressure sensor configured to measure pressure in a cylinder of the engine and generate a corresponding pressure signal and a crank angle sensor configured to measure the crank angle of the engine and generate a corresponding crank angle signal. The controller includes a processor couplable to the in-pressure sensor and the crank angle sensor and at least one non-transitory computer readable medium storing instructions operable to cause the processor of the controller to perform operations. The operations include: (a) sample the pressure signal, (b) calculate a combustion intensity metric based on the pressure signal, wherein the combustion intensity metric is an indicator of the engine's proximity to an uncontrolled combustion condition, (c) determine an engine control parameter as a function of the combustion intensity metric, and (d) control the engine based on the engine control parameter.

Certain aspects of the present disclosure have the following advantages: Reduces the risk of damaging a high substitution rate dual fuel engine. The calibration effort to detect uncontrolled combustion is greatly reduced as the Combustion Intensity metric uses known mechanical engine limits. Certain aspects also allow an engine to always operate with maximum substitution control without having to add in margin for safety, which provides a much better value proposition for the dual fuel engine operator.

DETAILED DESCRIPTION

Figure 1A:
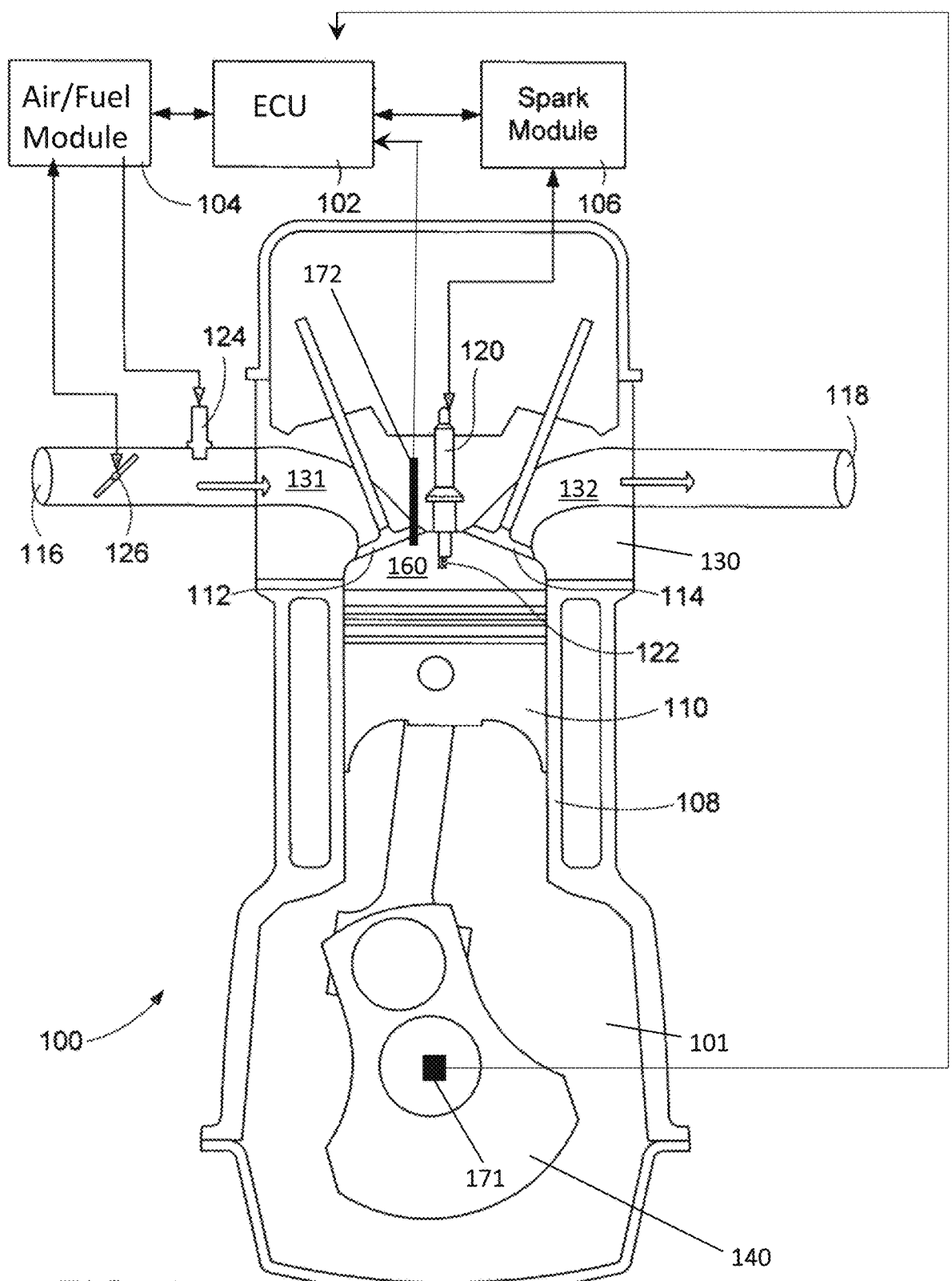
FIG. 1A is a schematic of a cross-sectional view of a cylinder of an internal combustion engine including an engine control system.

A new approach of detecting uncontrolled combustion is disclosed—namely combustion intensity (CI)—that monitors a mathematical combination of pressure and heat release metrics that can accurately predict the onset of uncontrolled combustion. Data from spark-ignited and dual fuel engines showcase the disadvantages of the traditional knock type, vibration frequency-based approaches, which work best at severe conditions, when there are extremely abrupt end-gas burn rates followed by high frequency oscillations. This technique falls short especially in dual fuel combustion, when there is diesel combustion ripple obfuscating the signal and at certain modes, when frequency content diminishes below normal detection thresholds. In contrast, embodiments of the CI metrics described herein provide monotonic trends as gas substitution increases across all operating points and even when gas quality, manifold air temperature, or other engine conditions changed. This provides a definitive control action path, which, in some instances, can be designed to a combustion intensity target. The gas substitution rate (GSR) at which these phases are encountered and the severity of combustion intensities may vary for different engine configurations, but the essential combustion phenomena disclosed herein should be universally relevant.

Pushing gas engines to their lean/low NOx and high BMEP limits and gas-diesel dual fuel engines to high substitution rates often leads to performance-limiting abrupt uncontrolled combustion such as knock. Understanding and detection of the progression of abnormal combustion is key to engine protection. Aspects of the present disclosure include the ability to detect the progression of uncontrolled combustion using both in-cylinder pressure in spark-ignited and dual fuel engines. For gas engines, pressure-based knock detection captures all the knock cycles while vibration-based knock detection misses a considerable percentage. For dual-fuel engines, the classical frequency-based detection approaches can detect severe combustion events, but do not provide a good continuously increasing signal. This makes engine control and calibration very difficult and therefore usually drives lower substitution rates in order to maintain a safety margin. This behavior is due to the diesel combustion process that creates pressure ripples in the cylinder.

Historically, the phrase "knock" has been used broadly to mean any form of "uncontrolled combustion" which is generally associated with "auto-ignition" phenomena due to compression and heating of combustible gas mixtures outside of the flame front. Controlled combustion would be characterized as a regular progression of the mass fraction burned that would be associated with a propagating flame. Classical knock would occur when the end-gas ahead of the flame auto-ignites due to pressure and temperature developed from the flame, but it is not in the flame. When auto-ignition occurs, it sends pressure waves across the cylinder which are detected as high frequency pressure oscillations and potential vibration noise.

Uncontrolled combustion can be characterized by a discontinuous sudden increase in the heat release rate, and this sudden increase in heat release rate will show up in the pressure trace shape, but it may or may not induce high frequency pressure oscillations. Unlike spark ignited engines, where uncontrolled combustion progressively builds in severity from incipiency to severe knock, providing enough time for a control action, onset of "uncontrolled combustion" in dual fuel engines can be sudden and non-monotonic. When this "uncontrolled combustion" occurs, high frequency oscillations are not always observed in either in-cylinder pressure or vibration-based knock sensor signals until it is often too late.

As substitution rates increase beyond a certain point, it was found that the vibration-knock signature decreases. If the engine is relying on knock for protection against excessive gas substitution rates, changing gas quality, or other influences, a robust control system is needed with progressively increasing signal feedback to maximize substitution while maintaining safe engine operation.

To achieve this, a new approach of detecting uncontrolled combustion is described that monitors a mathematical combination of pressure and heat release metrics that can accurately predict the progression of uncontrolled combustion providing a definitive control action path. With this approach, substitution rates can be maximized and maintained to a desired safety margin on a diesel dual-fuel engine.

Tests were conducted to vary the substitution rates at various speeds and loads to show the different combustion modes that can be seen in a diesel dual fuel engine. This data was used to determine a better approach to detect uncontrolled combustion in a dual fuel engine, proposing the term combustion intensity (CI). The combustion intensity metric described herein delivers a continuously increasing measure of the state of combustion to provide better controllability, while improving protection against uncontrolled combustion, since it is based upon direct monitoring of in-cylinder pressure concurrent with the combustion cycle.

For dual-fuel engines, as described above, traditional frequency based detection approaches and are able to detect severe combustion events, but do not provide a good continuously increasing signal that correlates with the severity. This makes engine control and calibration very difficult and usually drives to lower substitution rates in order to maintain a safety margin. For low gas substitution rates, the diesel combustion process dominates as diesel auto-ignition creates pressure ripple in the cylinder. As gas is added to the fresh charge, the intensity of the diesel ignited combustion increases in intensity—the gas amplifies the effect of diesel initiated combustion. However, as substitution rates increase beyond a certain point, the vibration knock signature decreases as the combustion shifts modes from "diesel like" to "premixed gas like" and the frequency based content starts to decrease with additional gas substitution. If the engine is relying on vibration base knock sensors for protection against excessive gas substitution rates, changing gas quality, or other influences, a robust control system is needed with progressively increasing signal feedback in order to maximize substitution while maintaining safe engine operation. To solve this problem, a new approach of detecting uncontrolled combustion in dual fuel engines is required.

One example solution described herein is the inclusion of at least one in-cylinder pressure sensor on the engine with the following combustion metrics being calculated concurrently with operation of the engine, and in some instances, in real-time: Peak Pressure, Location of Peak Pressure, Rate of Pressure Rise, Pressure Ripple, Location of Ripple, Burn Duration, and Slope of Heat Release, Location of Centroid of Heat Release Rate, Location of Max Heat Release Rate. In some instances, these metrics are then used together to determine how close the engine is operating to uncontrolled combustion. Based on this determination, the engine is allowed to be pushed to higher substitution rates while maintaining safe operation.

While the most demanding version of Dual fuel gas/diesel combustion refers herein to adding gaseous fuel to an existing diesel engine, the stock compression ratio, valve timing, and pistons are un-changed, this method applies to all Dual-Fuel gas/diesel engines including micro-pilot. Gas typically consists of natural gas, propane or biogas and it is introduced either at a single point—where it is fumigated into the intake system—or port injected near the intake valve. In some instances, Dual Fuel will refer to the continuous addition of natural gas to the combustion chamber of a stock diesel engine. As the gas substitution rate is increased, the diesel will "govern" by reducing the diesel quantity in equal energy ratios to maintain a target load.

Referring initially to FIG. 1A, an example engine system 100 usable with aspects of the present disclosure is shown. The engine system 100 includes an engine control unit 102, an air/fuel module 104, an ignition module 106, and an engine 101 (shown here as a reciprocating engine). FIG. 1A illustrates, for example, an internal combustion engine 100. For the purposes of this disclosure, the engine system 100 will be described as a gaseous-fueled reciprocating piston engine. In certain instances, the engine operates on natural gas fuel. The engine may be any other type of combustion engine, both in the type of fuel (gaseous, liquid (e.g., gasoline, diesel, and/or other), same phase or mixed phase multi-fuel, and/or another configuration) and the physical configuration of the engine (reciprocating, Wankel rotary, and/or other configuration). While the engine control unit 102, the air/fuel module 104 and the ignition module 106 are shown separately, the modules 102, 104, 106 may be combined into a single module or be part of an engine controller having other inputs and outputs.

The reciprocating engine 101 includes engine cylinder 108, a piston 110, an intake valve 112 and an exhaust valve 114. The engine 101 includes an engine block that includes one or more cylinders 108 (only one shown in FIG. 1). The engine 100 includes a combustion chamber 160 formed by the cylinder 108, the piston 110, and a head 130. A spark plug 120 or direct fuel injector or prechamber is positioned within the head 130 which enables the ignition device access to the combustible mixture. In general, the term "spark plug" can refer to a direct fuel injection device and/or spark plug or other ignition device within a prechamber. In the case of a spark plug, a spark gap 122 of the spark plug 120 is positioned within the combustion chamber 160. In some instances, the spark gap 122 is an arrangement of two or more electrodes with a small space in-between. When an electric current is applied to one of the electrodes, an electric arc is created that bridges the small space (i.e., the spark gap) between the electrodes. Other types of igniters can be used, including laser igniters, hot surface igniters and/or yet other types of igniters. The piston 110 within each cylinder 108 moves between a top-dead-center (TDC) position and a bottom-dead-center (BDC) position. The engine 100 includes a crankshaft 140 that is connected each piston 110 such that the piston 108 moves between the TDC and BDC positions within each cylinder 108 and rotates the crankshaft 140. The TDC position is the position the piston 110 with a minimum volume of the combustion chamber 160 (i.e., the piston's 110 closest approach to the spark plug 120 and top of the combustion chamber 160), and the BDC position is the position of the piston 110 with a maximum volume of the combustion chamber 160 (i.e., the piston's 110 farthest retreat from the spark plug 120 and top of the combustion chamber 160).

The cylinder head 130 defines an intake passageway 131 and an exhaust passageway 132. The intake passageway 131 directs air or an air and fuel mixture from an intake manifold 116 into combustion chamber 160. The exhaust passageway 132 directs exhaust gases from combustion chamber 160 into an exhaust manifold 118. The intake manifold 116 is in communication with the cylinder 108 through the intake passageway 131 and intake valve 112. The exhaust manifold 118 receives exhaust gases from the cylinder 108 via the exhaust valve 114 and exhaust passageway 132. The intake valve 112 and exhaust valve 114 are controlled via a valve actuation assembly for each cylinder, which may include be electronically, mechanically, hydraulically, or pneumatically controlled or controlled via a camshaft (not shown).

Movement of the piston 110 between the TDC and BDC positions within each cylinder 108 defines an intake stroke, a compression stroke, a combustion or power stroke, and an exhaust stroke. The intake stroke is the movement of the piston 110 away from the spark plug 120 with the intake valve 112 is open and a fuel/air mixture being drawn into the combustion chamber 160 via the intake passageway 131. The compression stroke is movement of the piston 110 towards the spark plug 120 with the air/fuel mixture in the combustion chamber 160 and both the intake value 112 and exhaust valve 114 are closed, thereby enabling the movement of the piston 110 to compress the fuel/air mixture in the combustion chamber 160. The combustion or power stroke is the movement of the piston 110 away from the spark plug 120 that occurs after the combustion stroke when the spark plug 120 ignites the compressed fuel/air mixture in the combustion chamber by generating an arc in the spark gap 122. The ignited fuel/air mixture combusts and rapidly raises the pressure in the combustion chamber 160, applying an expansion force onto the movement of the piston 110 away from the spark plug 120. The exhaust stroke is the movement of the piston 110 towards the spark plug 120 after the combustion stroke and with the exhaust valve 114 open to allow the piston 110 to expel the combustion gases to the exhaust manifold 118 via the exhaust passageway 118.

The engine 100 includes a fueling device 124, such as a fuel injector, gas mixer, or other fueling device, to direct fuel into the intake manifold 116 or directly into the combustion chamber 160. In some instances the engine 100 is a dual duel engine having two sources of fuel into the combustion chamber 160.

In some instances, the engine system 100 could include another type of internal combustion engine 101 that doesn't have pistons/cylinders, for example, a Wankel engine (i.e., a rotor in a combustion chamber). In some instances, the engine 101 includes two or more spark plugs 120 in each combustion chamber 160.

During operation of the engine, i.e., during a combustion event in the combustion chamber 160, the air/fuel module 104 supplies fuel to a flow of incoming air in the intake manifold before entering the combustion chamber 160. The spark module 106 controls the ignition of the air/fuel in the combustion chamber 160 by regulating the timing of the creation of the arc the spark gap 122, which initiates combustion of the fuel/air mixture within combustion chamber 160 during a series of ignition events between each successive compression and combustion strokes of the piston 110. During each ignition event, the spark module 106 controls ignition timing and provides power to the primary ignition coil of the spark plug 120. The air/fuel module 104 controls the fuel injection device 124 and may control throttle valve 126 to deliver air and fuel, at a target ratio, to the engine cylinder 108. The air/fuel module 104 receives feedback from engine control module 102 and adjusts the air/fuel ratio. The spark module 106 controls the spark plug 120 by controlling the operation of an ignition coil electrically coupled to the spark plug and supplied with electric current from a power source. The ECU 102 regulates operation of the spark module 106 based on the engine speed and load and in addition to aspects of the present system disclosed below.

In some instances, the ECU 102 includes the spark module 106 and the fuel/air module 104 as an integrated software algorithms executed by a processor of the ECU 102, and thereby operate of the engine as single hardware module, in response to input received from one or more sensors (not shown) which may be located throughout the engine. In some instances, the ECU 102 includes separate software algorithms corresponding to the described operation of the fuel/air module 104 and the spark module 106. In some instances, the ECU 102 includes individual hardware module that assist in the implementation or control of the described functions of the fuel/air module 104 and the spark module 106. For example, the spark module 106 of the ECU 102 may include an ASIC to regulate electric current delivery to the ignition coil of the spark plug 120. A plurality of sensor systems exist to monitor the operational parameters of an engine 100, which may include, for example, a crank shaft sensor, an engine speed sensor, an engine load sensor, an intake manifold pressure sensor, an in-cylinder pressure sensor, etc. Generally, these sensors generate a signal in response to an engine operational parameter. For example, a crank shaft sensor 171 reads and generates a signal indicative of the angular position of crankshaft 140. In an exemplary embodiment, a high speed pressure sensor 172 measures in-cylinder pressure during operation of the engine 100. The sensors 171,172 may be directly connected to the ECU 102 to facilitate the sensing, or, in some instances are integrated with a real-time combustion diagnostic and control (RT-CDC) unit configured to acquire high speed data from one or more of the sensor and provide a low speed data output to the ECU 102. In some instances, the ignition control described herein is a stand-alone ignition control system providing the operation of ECU 102 and the spark module 106. The sensors may be integrated into one of the control modules, such as the ECU 102 or a RT-CDC. Other sensors are also possible, and the systems described herein may include more than one such sensor to facilitate sensing the engine operational parameters mentioned above.

Figure 1B:
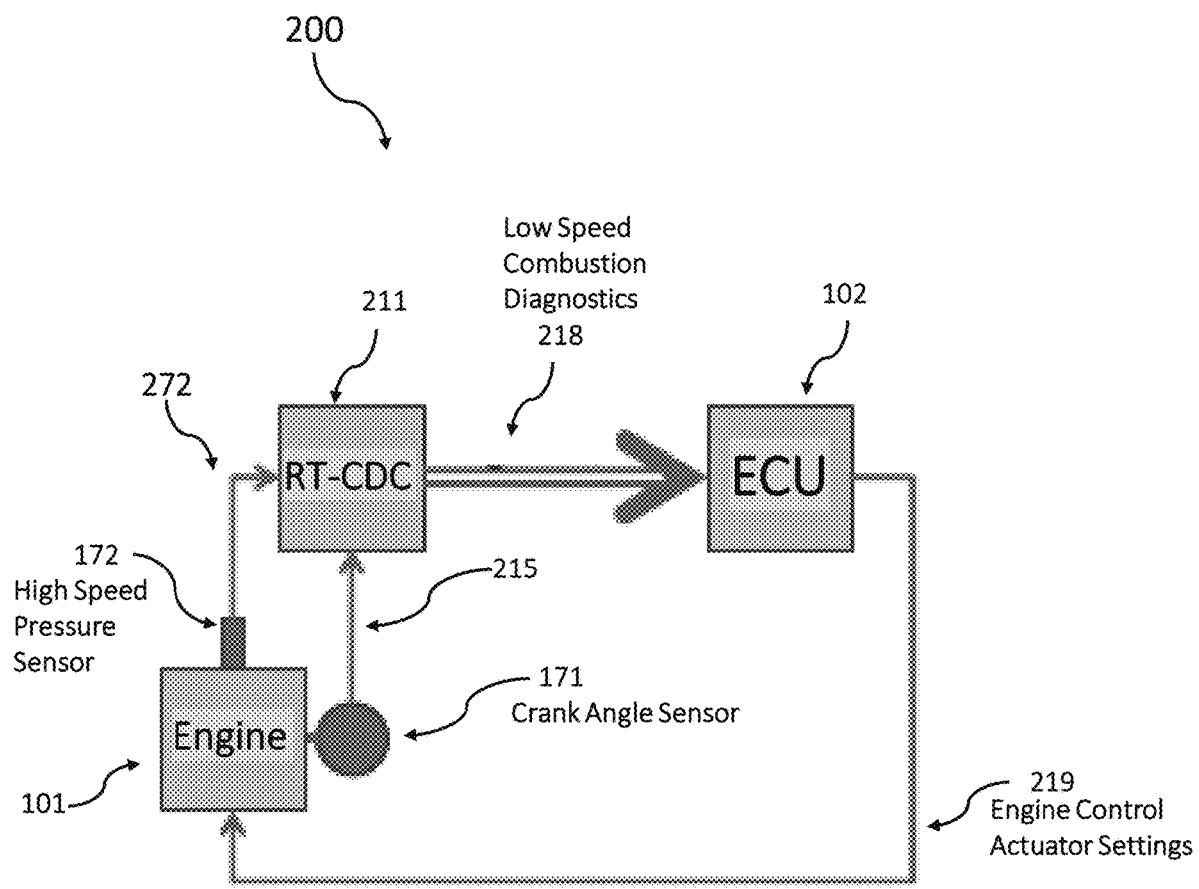
FIG. 1B is a schematic of the engine control system.

FIG. 1B is a schematic of an engine control system 200 of the engine system 100 of FIG. 1A. FIG. 1B shows the ECU 102 within the engine control system 200 configured to control the engine 101. As indicated above, high-speed pressure data 272 is generated by pressure sensors 172, each mounted with direct access to the combustion chamber. The pressure signal 272 is captured at a high crank-synchronous rate, for example, 0.25° resolution or 2880 samples per cycle of the engine 101. This synthetic crank angle signal is generated from the lower resolution crank position signal. For example, with a typical crank angle encoder 171 generating a crank angle signal 215 by sensing passage of the edge of teeth on a disk, the disk mounted to rotate with the crank, the resolution of the crank position is based on the number of teeth. A typical 60-2 tooth wheel has a resolution of 6°. However, in some instances, interpolation is used to determine a crank angle in the space between of the edges. Thus, the spacing between edges uses the previously observed tooth period divided by the number of edges required to achieve the desired angular sampling resolution. To account for minor variability between the crank teeth that can be seen even when the average engine speed is constant, and the encoder system is re-synchronized on each edge.

In some instances, the resulting high-resolution pressure signal 272 is used by the combustion diagnostics routine in the Real-time Combustion Diagnostics and Control (RT-CDC) 211 module to produce the combustion diagnostics 219 on a per-cylinder, per cycle basis, for example, IMEP, $P_{max}$, CA50, combustion quality, and combustion intensity, as discussed in more detail below. The metrics 218 are subsequently used by the ECU 102 as a feedback signal for adjusting key combustion performance characteristics by modulating engine control actuator settings 219.

Figure 1C:
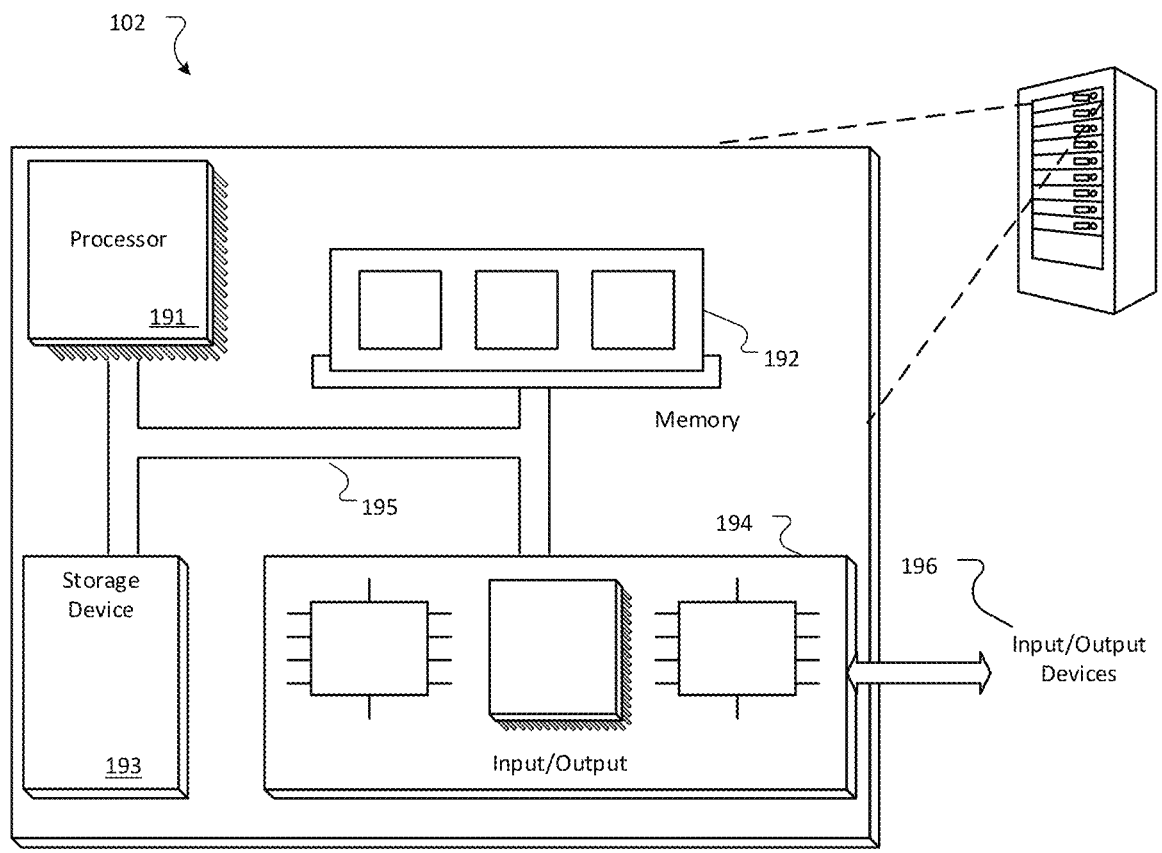
FIG. 1C is a block diagram of an example engine control system with a processor and memory.

FIG. 1C is a block diagram of an example engine control unit 102 configured to have aspects of the systems and methods disclosed herein. The example engine control unit 102 includes a processor 191, a memory 192, a storage device 1930, and one or more input/output interface devices 194. Each of the components 191, 192, 193, and 194 can be interconnected, for example, using a system bus 195.

The processor 191 is capable of processing instructions for execution within the engine control unit 102. The term "execution" as used here refers to a technique in which program code causes a processor to carry out one or more processor instructions. In some implementations, the processor 191 is a single-threaded processor. In some implementations, the processor 191 is a multi-threaded processor. The processor 191 is capable of processing instructions stored in the memory 192 or on the storage device 193. The processor 1910 may execute operations such as calculating of a combustion intensity.

The memory 192 stores information within the engine control unit 102. In some implementations, the memory 192 is a computer-readable medium. In some implementations, the memory 192 is a volatile memory unit. In some implementations, the memory 192 is a non-volatile memory unit.

The storage device 193 is capable of providing mass storage for the engine control unit 102. In some implementations, the storage device 193 is a non-transitory computer-readable medium. In various different implementations, the storage device 193 can include, for example, a hard disk device, an optical disk device, a solid-state drive, a flash drive, magnetic tape, or some other large capacity storage device. The input/output interface devices 194 provide input/output operations for the engine control unit 102. In some implementations, the input/output interface devices 194 can include an in-cylinder pressure sensor 172, a crank angle sensor 171, or other engine sensors.

In some examples, the engine control unit 102 is contained within a single integrated circuit package. An engine control unit 102 of this kind, in which both a processor 191 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 1140.

Certain aspects of the concepts described herein encompass the ability to collect and process in-cylinder pressure information on a cycle-to-cycle basis as well as the following algorithms:

(I) Peak Pressure—The maximum combustion pressure during one event (II) Rate of Pressure Rise—the maximum rate of pressure rise during combustion (III) Pressure Ripple—Summation of the delta P, also known as "Pressure Based Knock Index"

(IV) Burn Duration—Crank Angle degrees between CAx1 and CAx2

(V) Slope of Heat Release—Determination of the first half combustion process compared to the second half of the combustion process (VI) Location of Peak Pressure (VII) Location of Ripple (VIII) Location of Centroid of Heat Release Rate (IX) Location of Max Heat Release Rate Certain aspects of the present disclosure use the combustion metrics listed above to determine a combustion intensity number that can then be used in a control loop to drive the engine safely to maximum gas substitution. All of these metrics are needed in order to cover many different cases that can be seen on a dual fuel engine.

One example of an enabling technology disclosed herein is the heat release change algorithm as well as burn duration. The heat release change can be statically determined or dynamically determined such that the inflection point of where combustion speeds up is accurately determined.

Figure 2:
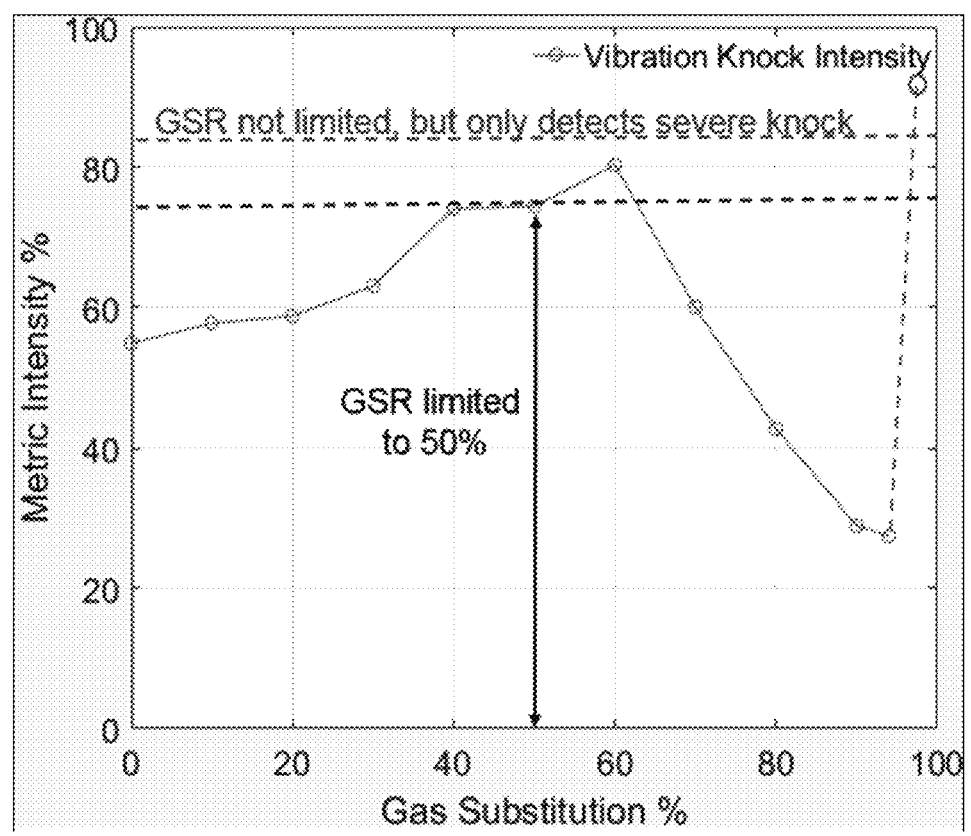
FIG. 2 is a graph of the effect of processed accelerometer detection as a function of gas substitution.

Previously, in a dual fuel engine, vibration sensors were used, but they only allow the controller to detect heavy knock due to the presence of extreme auto-ignition. Traditional solutions use accelerometers to determine the frequency and amplitude in order to detect detonation. However, the traditional solutions do not work well for dual fuel engines, as the signal reduces as you get to higher substitution rates. This makes it very difficult to understand the proximity to uncontrolled combustion. If higher substitution rates are desired, the threshold for the controller to take action must be greater than the highest signal during normal dual fuel combustion. To maintain safe engine operation, the knock threshold should be below the highest intensity, however that will limit the allowable substitution rates as shown in FIG. 2. FIG. 2 shows a plot of what the processed accelerometer detection does as a function of gas substitution in an example engine, as discussed in more detail below. This technique fails especially in dual fuel combustion due to the diesel combustion ripple obfuscating the signal at certain dual fuel modes, and later when all frequency content disappears at high GSR, providing no clear indication of safety margin to uncontrolled combustion. A more robust detection methodology is needed that can capture the state of combustion. With this in mind, a combustion intensity (CI) metric was formulated.

Certain aspects of the present disclosure relate to the use of direct in-cylinder pressure measurements to calculate engine metrics that can be used in a certain combination to give an increasing detection signal as substitution rate continues to increase. This allows the engine controller to achieve maximum substitution while understanding how close the engine is to uncontrolled combustion therefore maintaining safe engine operation. One example of the CI metric is expressed weighted sum of heat release rate and pressure rise rate metrics, while including classical metrics like pressure ripple and peak pressure. In some instances the CI may be any mathematical combination of any of the parameters identified above such as a polynomial, weighted sum, sum of exponentials or power law, or a nonlinear function, CI=function (Peak Pressure, Rate of Pressure Rise, Pressure Ripple, Burn Duration, Change Rate of Heat Release, Knock Index)

One example combustion intensity metric is expressed as a linear sum of parameters such as shown below in Equation 1.

$$CI = (a1 \cdot \text{Peak Pressure}) + (a2 \cdot \text{Rate of Pressure Rise}) + (a3 \cdot \text{Pressure Ripple}) + (a3 \cdot \text{Burn Duration}) + (a4 \cdot \text{Change Rate of Heat Release}) + (a5 \cdot \text{Knock Index})$$

Equation 1:

This CI metric, which uses pressure-based information and heat release information and does not have the limitations of the traditional vibration-based detection. In some instances, the CI metric is a sum of pressure metrics, heat release metrics, and classical knock metrics.

Figure 6:
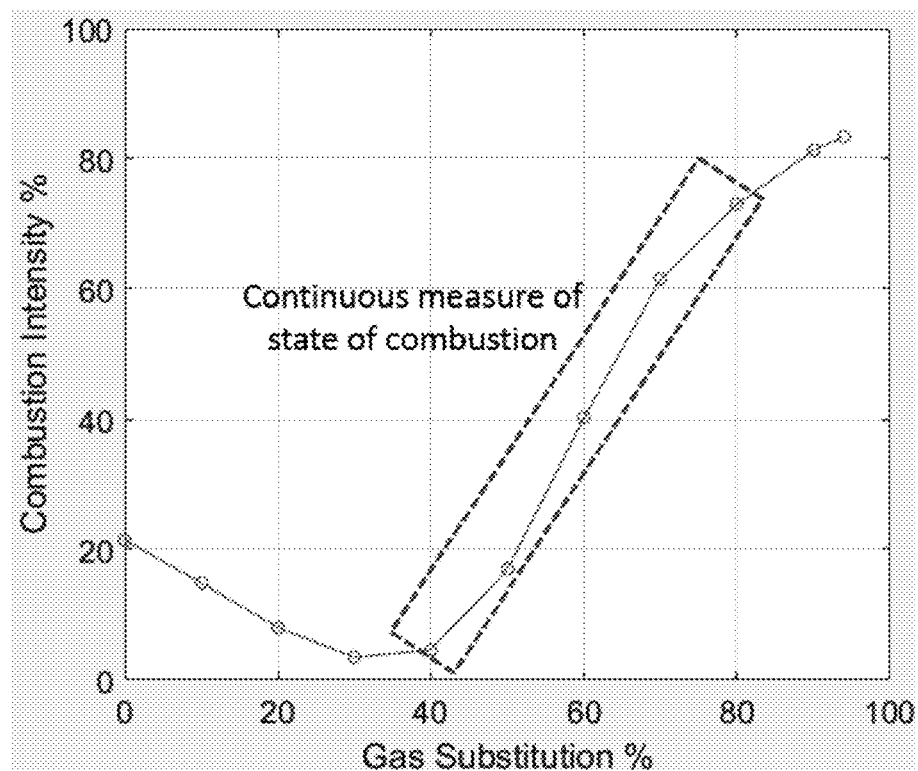
FIG. 6 is a graph illustrating the effect of a combustion intensity metric versus a classical knock intensity metrics as a measure of proximity to uncontrolled combustion and as a function of gas substitution.

In some instances, the CI metric incorporates practical engine limits that can be easily calibrated with knowledge of the mechanical limits of the engine. In some instances, this CI metric also incorporates the classical knock detection and peak pressure limits in order to have a secondary safety measure. The CI metric correlates well with the qualitative sense of combustion observable in the pressure traces during calibration in the lab. The combustion intensity metric shown in FIG. 6 is progressively increased from 30 to 94% as gas substitution is increased. FIG. 6, discussed in more detail below in Example 1, illustrates what the combustion intensity metric does as a function of gas substitution showing the combustion intensity metric vs. classical knock intensity metrics as a measure of proximity to uncontrolled combustion. A clear linear control action path can be set to which a controller can be targeted to maximize gas substitution while maintaining a desired safety margin from uncontrolled combustion. In some instances the combustion intensity metric describes (or is used to determine) how close the engine is operating to uncontrolled combustion. This allows the engine to be pushed to higher substitution rates while maintaining safe operation by, for example, allowing the GSR to be increased while maintaining safe engine operation by using the combustion intensity metric to control the increase of the GSR without causing uncontrolled combustion. The combustion intensity metric enables this safe increase by, for example, providing a more accurate 'picture' of the current state of combustion because the CI metric increases with likelihood of uncontrolled combustion. Therefore, the use of a CI metric in an engine control can, for example, enable the selection of a target CI value and then using the CI metric in a control loop to maximize GSR within the target CI. In some instances, the CI metric reduces calibration requirements.

Aspects of the present disclosure enable uncontrolled combustion (detonation) to no longer be considered in the traditional time based frequency domain, but instead from direct in-cylinder pressure information which is based on practical engine limits. Aspects enable reduction of the risk of damaging a high substitution rate dual fuel engine. The calibration effort to detect uncontrolled combustion is greatly reduced as the Combustion Intensity metric uses known mechanical engine limits. Example implementations also allows the engine to always operate with maximum substitution control without having to add in margin for safety which provides a much better value proposition for the dual fuel engine operator.

An example improvement from vibration-based detection is the incorporation of heat release concurrent with combustion, as this is the primary effect of adding natural gas as can be seen in the plot of the smoothed heat release traces at 0%, 60% and 90% gas substitution rate (GSR) shown in FIG. 7, discussed in more detail below in Example 1. As natural gas is added, the traditional diesel pre-mixed spike is reduced and then progresses to a heat release rate that is very aggressive at 60%. This can be monitored in order to understand the current state of combustion intensity. At 90% GSR and above, the combustion becomes completely gas dominant, and the engine behaves almost like a spark ignition engine or a micro-pilot ignited gas engine.

The CI metric is a progressive measure of the state of combustion and is a good indicator of proximity to uncontrolled combustion as can be seen in the following example.

Example 1

A study of the effect of gas addition on the original diesel combustion characteristics of a diesel-natural gas dual fuel engine was conducted, where the stock engine compression ratio of the original diesel engine was left unchanged. The specifications of the dual fuel engine used in the study are shown in Table 1. A Woodward knock sensor (WLEKS) and Kistler 6058A piezoelectric in-cylinder pressure sensors were used to capture any uncontrolled combustion on a Dewetron combustion analyzer, sampling at 200 kHz. The engine was always brought to a stable operating condition with 100% diesel targeting set points for IMEP and MAT, before gas was substituted for diesel using chemical energy split calculations. The diesel fuel was injected between 2 to 8 degrees before top dead center, depending on where in the speed load map the engine was operating. The gas substitution rate (GSR) was increased in steps of 10% increments and repeated at different speed and load points. The data shown in the following figures (FIGS. 2-11) is averaged over 300 combustion cycles. The methane number of the natural gas used in this study was approximately 82, with 84% methane, 9% ethane and 1% propane.

TABLE 1

| Dual Fuel engine specification | |
|---|---|
| Cylinders | 4 |
| Bore | 82 mm |
| Stroke | 90.4 mm |
| Compression Ratio | 17.5:1 |
| Fueling-Diesel | Common Rail |
| Fueling-Gas | Port Injected |
| Rated Torque | 315 nM @ 2000 RPM |
| Maximum BMEP | 20 bar |

Figure 3:
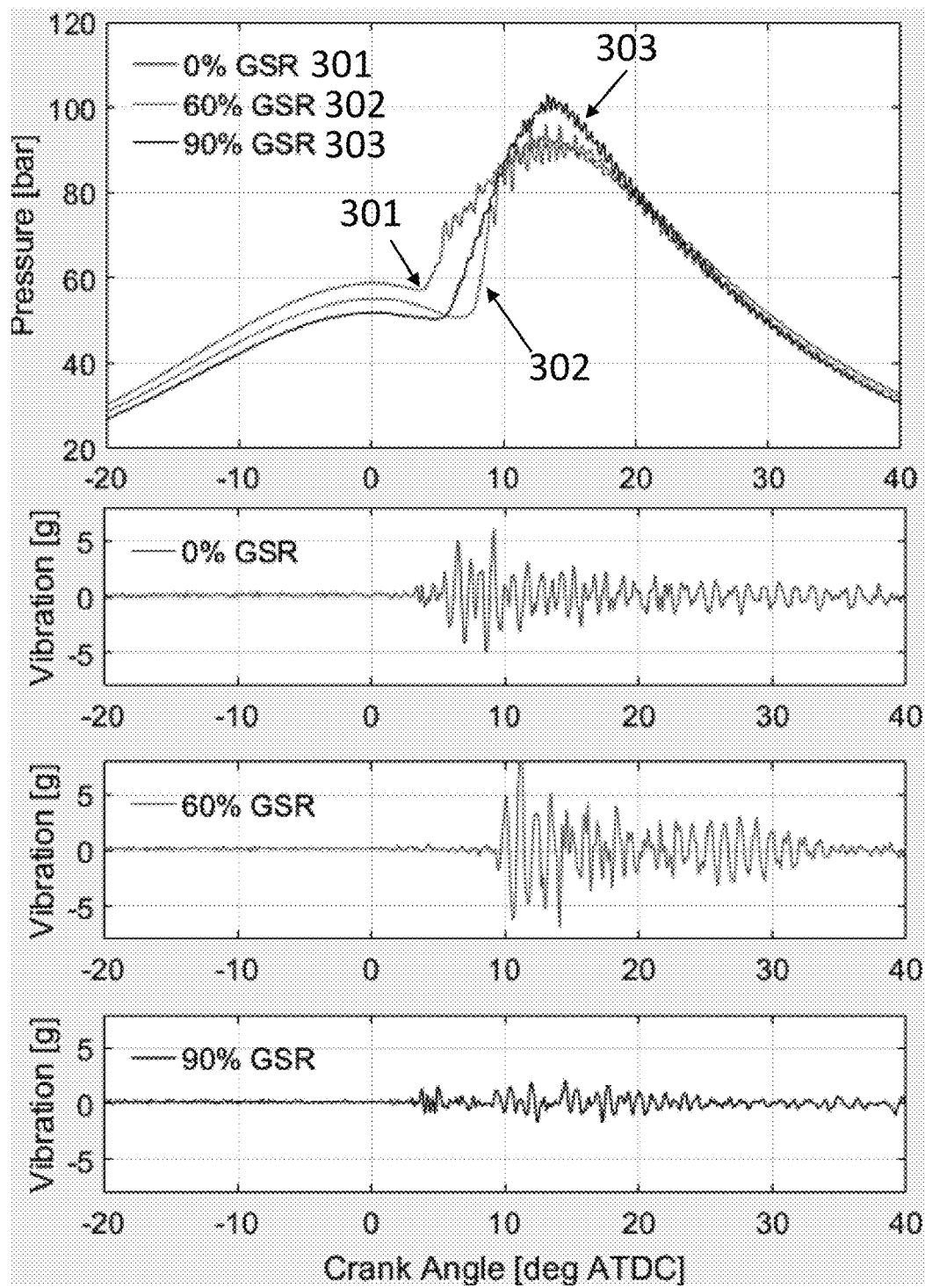
FIG. 3 is a plot of in-cylinder pressure and vibration traces at 0%, 60% and 90% gas substitution rate.

An example of the raw in-cylinder pressure and vibration knock traces captured at 10 bar IMEP, 1400 rpm, is plotted in FIG. 3. FIG. 3 is a plot of in-cylinder pressure and vibration traces at 0%, 60% and 90% gas substitution rate 301, 302, 303 (GSR), at 1400 rpm and 10 bar IMEP. FIG. 3 shows that a pressure ripple (diesel combustion) is visible at 0% gas (100% diesel) operation. As the gas is increased from 0 to 30% GSR (not shown), the overall combustion initially becomes quieter, where diesel combustion is still dominant. Further increase to 60% (second curve) shows a zone of noisier diesel-gas combustion, with increased knock frequency components detected with both vibration and in-cylinder pressure sensors. This can be seen in FIG. 2 where the pressure and vibration knock intensity reach a maximum at 60% GSR. At 90% GSR, the vibration signal is at its quietest (third curve).

Figure 4:
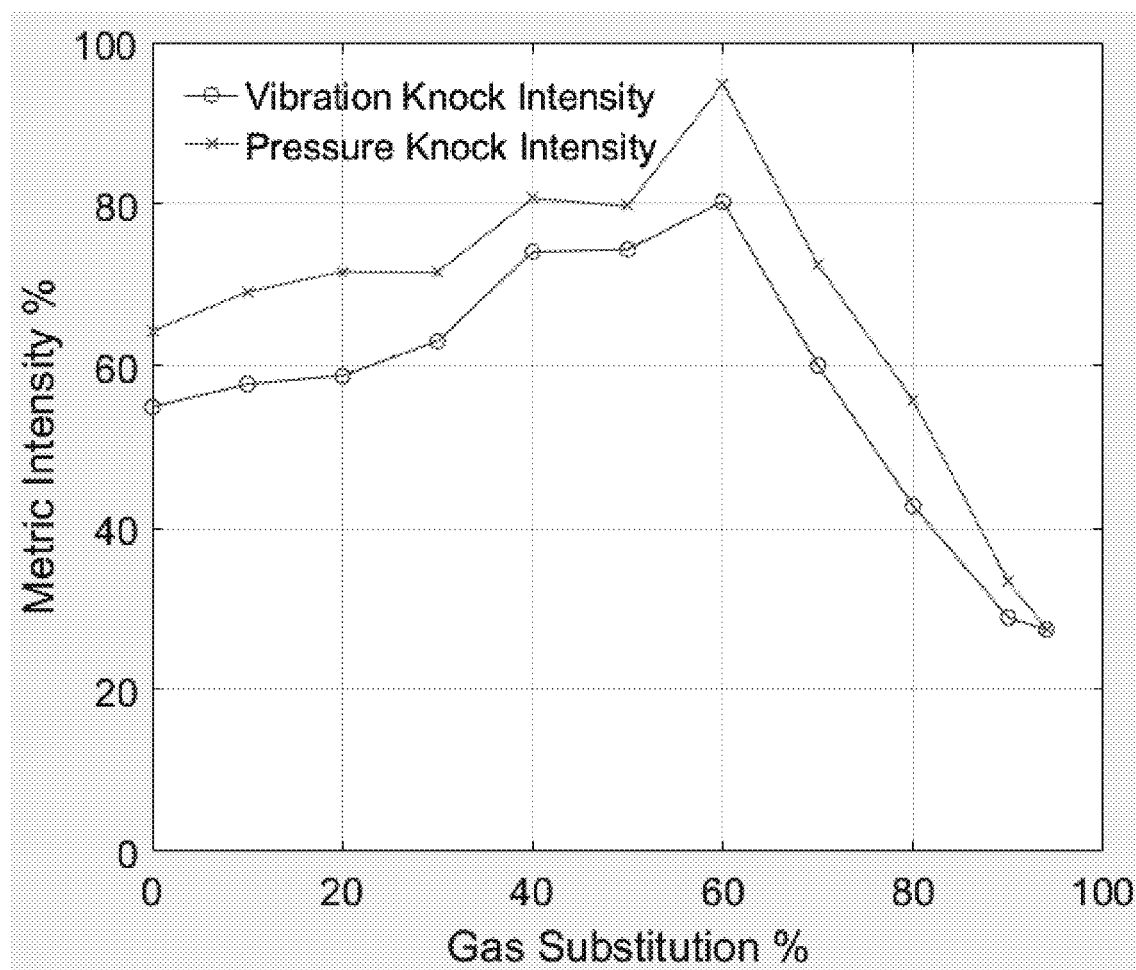
FIG. 4 is a plot of vibration and pressure knock intensity versus gas substitution ratio.

FIG. 4 is a plot of vibration and pressure knock intensity versus gas substitution ratio. FIGS. 3 and 4 show the challenge: the vibration knock signature increases in intensity from 0 to 60% GSR at this operating point, captured also in FIG. 4, but then turns and decreases to its lowest value at 90% substitution—just before very intense combustion knock is observed (and noted in FIG. 2, but unable to record over 300 cycles). As the gas substitution was increased from 60% to 85% gas substitution, the gas combustion becomes increasingly dominating during the latter half of combustion. In this phase, all frequency content disappears as seen in FIG. 4. Classical approaches of pressure ripple or knock spectral content become difficult to detect proximity to knock or uncontrolled combustion. This creates a very difficult control issue for the engine controller because it is difficult to accurately perform closed loop control when the engine operates near uncontrolled combustion. This is different from a spark-ignited gas engine where vibration based knock can detect light, medium, and heavy knock, thus giving the controller the ability to adjust engine parameters before heavy/severe knock occurs. In a dual fuel engine, vibration sensors can be used, but they only allow the controller to detect heavy knock due to the presence of extreme auto-ignition. It would be wise to use open loop tables or a much lower allowable GSR to keep the knock levels in the monotonic range. If higher substitution rates are desired, the threshold for the controller to take action must be greater than the highest signal during normal dual fuel combustion. To maintain safe engine operation, the knock threshold should be below the highest intensity; however, that will limit the allowable substitution rates as shown in FIG. 1.

Figure 5B:
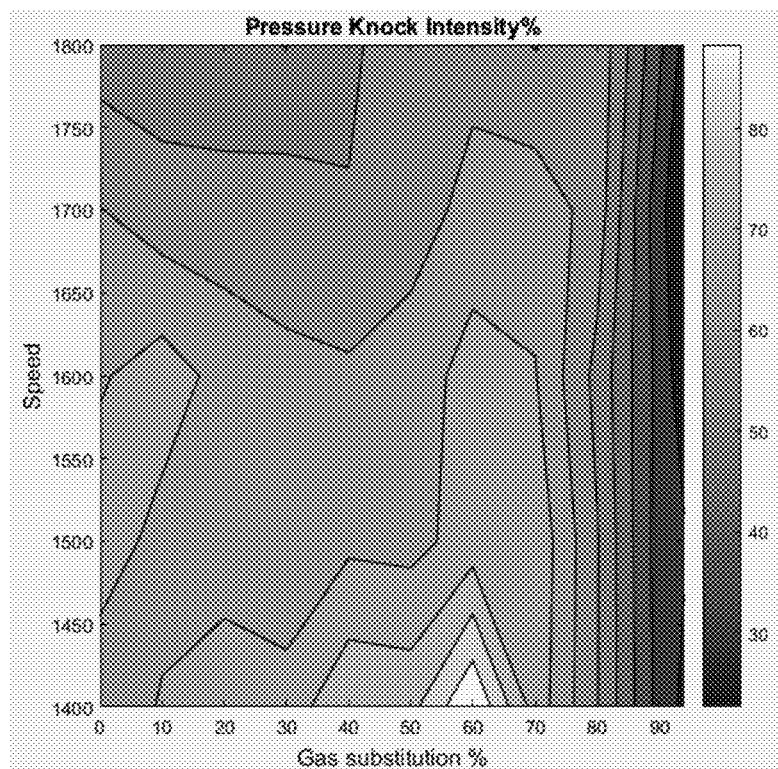
FIG. 5B is a 2-D contour plots of vibration knock intensity at various speeds versus gas substitution.
Figure 5A:
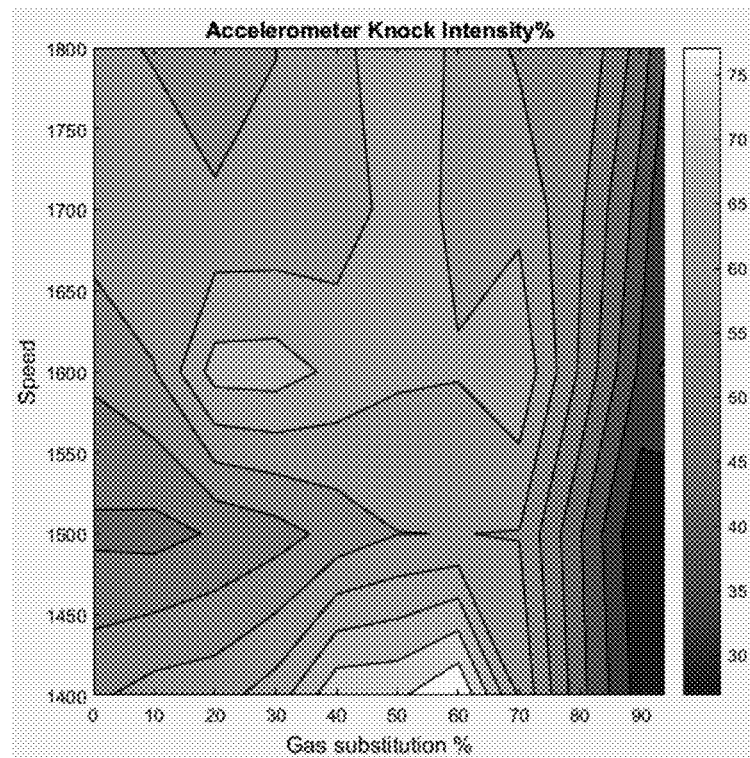
FIG. 5A is a 2-D contour plot of pressure knock intensity at various speeds versus gas substitution

FIG. 5A is a 2-D contour plot of pressure knock intensity at various speeds versus gas substitution and FIG. 5B is a 2-D contour plots of vibration knock intensity at various speeds versus gas substitution. FIGS. 5A and 6B indicate the non-monotonic and non-linear trends, which will prove difficult to design a robust control around. The pressure knock intensity and vibration knock intensity techniques fail in dual fuel combustion due to the diesel combustion ripple obfuscating the signal at certain dual fuel modes, and later when all frequency content disappear at high GSR, providing no clear indication of safety margin to uncontrolled combustion.

FIG. 6 is a graph illustrating the effect of a combustion intensity (CI) metric versus a classical knock intensity metrics as a measure of proximity to uncontrolled combustion and as a function of gas substitution. The CI metric of the present disclosure is a more robust detection methodology that can capture the state of combustion. FIG. 6 shows that the CI metric provides a good indicator of proximity to uncontrolled combustion, and, in some instances, the CI metric is a progressive measure of the state of combustion. The CI metric incorporates practical engine limits that can be calibrated with knowledge of the mechanical limits of the engine. In some implementation, and as show above in Equation 1, the CI is a weighted sum of heat release rate and pressure rise rate metrics, in addition to including classical metrics like pressure ripple and peak pressure. In some instances, the CI metric, which uses pressure-based information and heat release information, does not have the limitations of the traditional vibration-based detection. In some instances, the CI metric also incorporates the classical knock detection and peak pressure limits in order to have a secondary safety measure. In some implementations, the CI metric correlates well with the qualitative sense of combustion observable in the pressure traces during calibration in the lab.

Figure 7:
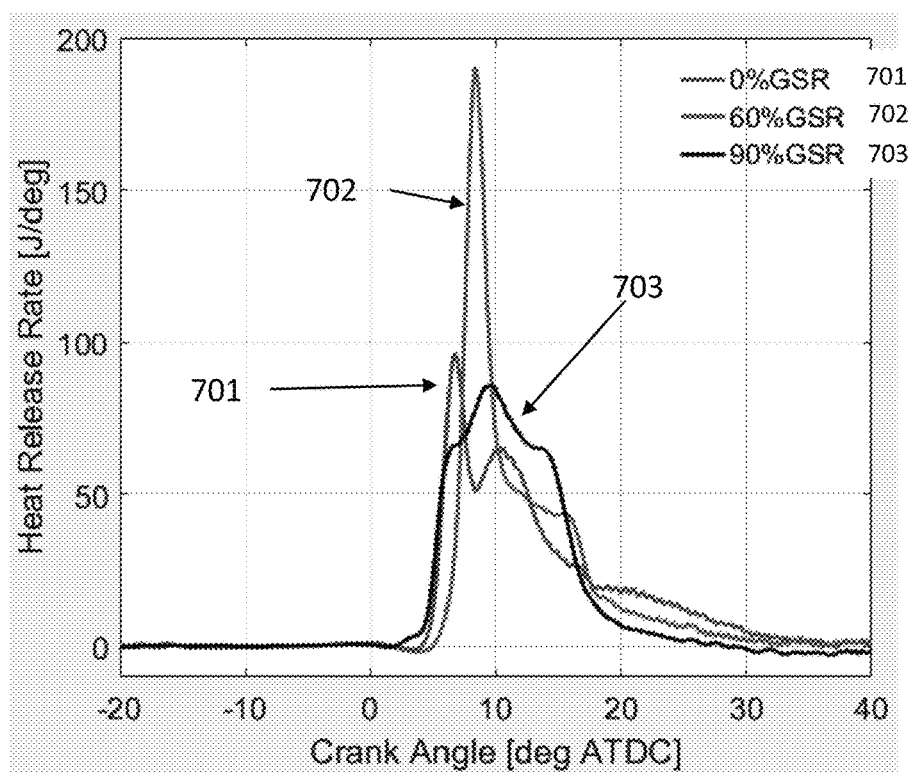
FIG. 7 is a plot of smoothed heat release traces at 0%, 60% and 90% gas substitution rate.
Figure 8:
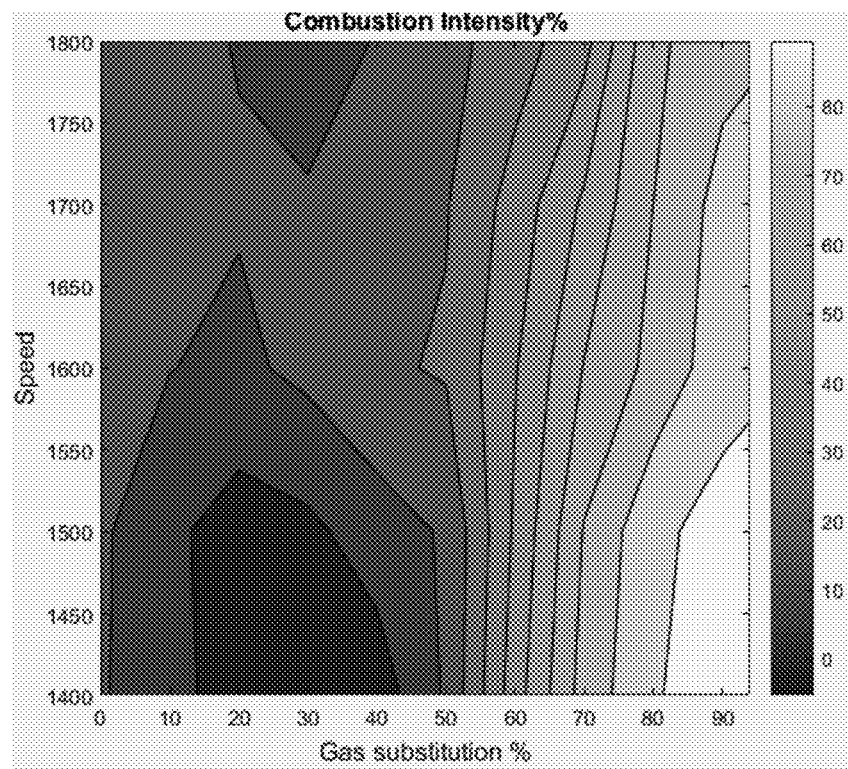
FIG. 8 is a 2-D contour plot of combustion intensity at various speeds versus gas substitution.

FIG. 7 is a plot of smoothed heat release traces at 0% (701), 60% (702) and 90% (703) gas substitution rate. A major improvement from vibration-based detection is the incorporation of real-time heat release, as this is the primary effect of adding natural gas as can be seen in the plot of the smoothed heat release traces at 0%, 60% and 90% gas substitution rate (GSR) shown in FIG. 7. As natural gas is added, the traditional diesel pre-mixed spike is reduced and then progresses to a combined heat release rate that is very aggressive at 60%. This can be monitored in order to understand the current state of combustion intensity. At 90% GSR and above, the combustion becomes completely gas dominant, and the engine behaves almost like a spark ignition engine or a micro-pilot ignited gas engine.

Referring again to FIG. 6, the CI metric progressively increased as gas substitution is increased from 30 to 94%. A clear linear control action path can be set to which a controller can be targeted to maximize gas substitution while maintaining a desired safety margin from uncontrolled combustion. This linearity is seen even in a 2-D contour plot of combustion intensity shown in FIG. 8 with monotonic trends across all speeds. One of the metric in the CI calculation that helped linearize this metric is the heat release rates, as the combustion in the latter half of the burn duration gets faster as more gas is added, as shown in FIG. 9.

Figure 9:
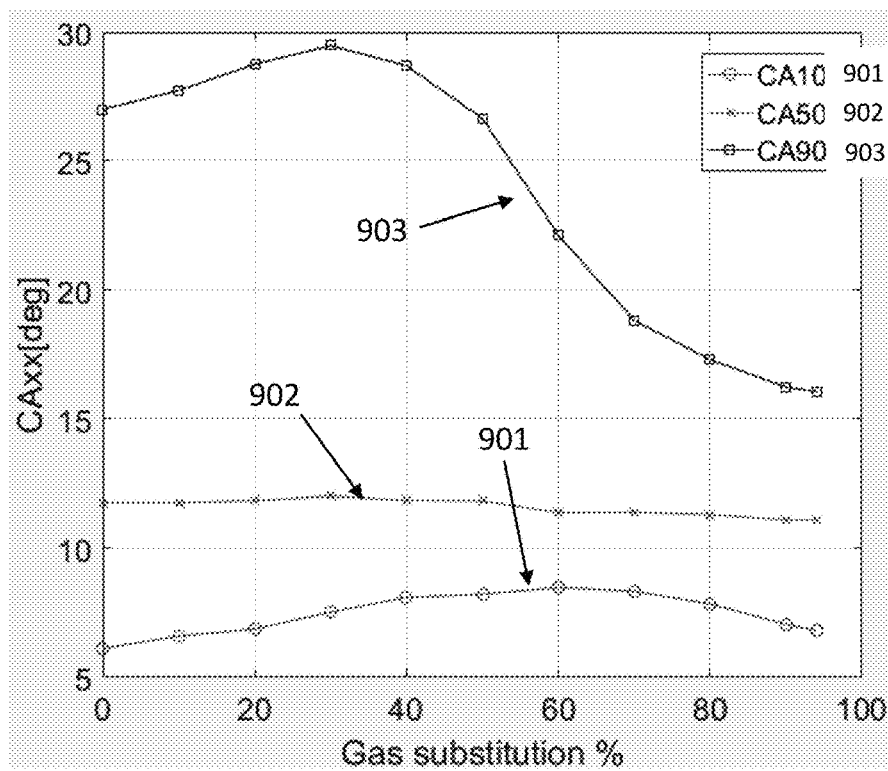
FIG. 9 is a plot of angle locations of 10%, 50% and 90% of total heat release versus gas substitution.

FIG. 9 is a plot of angle locations of 10% (901), 50% (902) and 90% (903) of total heat release versus gas substitution. In FIG. 9, the crank angle locations of 10%, 50% and 90% of total heat release are shown, which helps understand the combustion phasing, ignition delays and the burn rates. As diesel was replaced by gas, the start of injection (SOI) and the CA50 were not affected at this operating point, showing that the combustion phasing did not change much. The angular interval between CA90 and CA50 decreased sharply as GSR was increased, indicating a faster burn of end-gas. In addition, CA10 increased slightly showing greater ignition delay as GSR was increased from 0 to 70%. As gas displaces the air, the oxygen concentration would be lower, so the mixture is richer and the ignition delay is longer. Correspondingly, as the gas/air mixture gets richer, the flame speed increases continuously until a very short burn duration is evident as are the conditions for end-gas auto-ignition. At the operating point shown above, end-gas auto-ignition conditions were not reached, and GSR was pushed to 94% at which point the limit of diesel injector delivery was reached.

Figure 10:
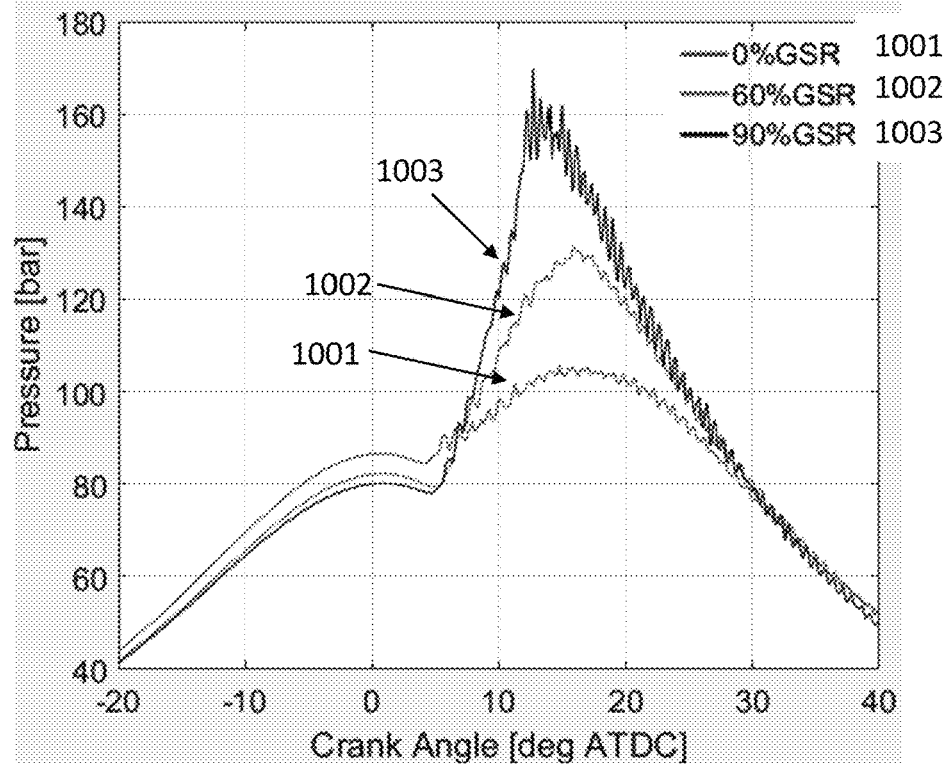
FIG. 10 is a plot of in-cylinder pressure at 0%, 60% and 90% gas substitution rate versus crank angle.
Figure 11:
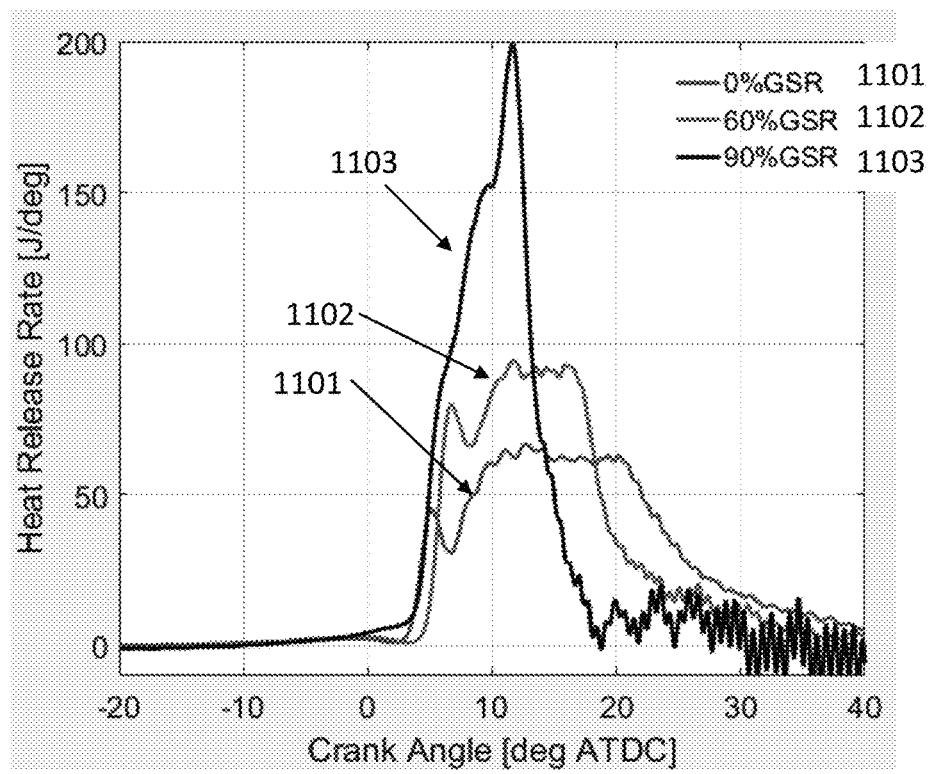
FIG. 11 is a plot of a smoothed heat release traces at 0%, 60% and 90% gas substitution rate versus crank angle.
Figure 12:
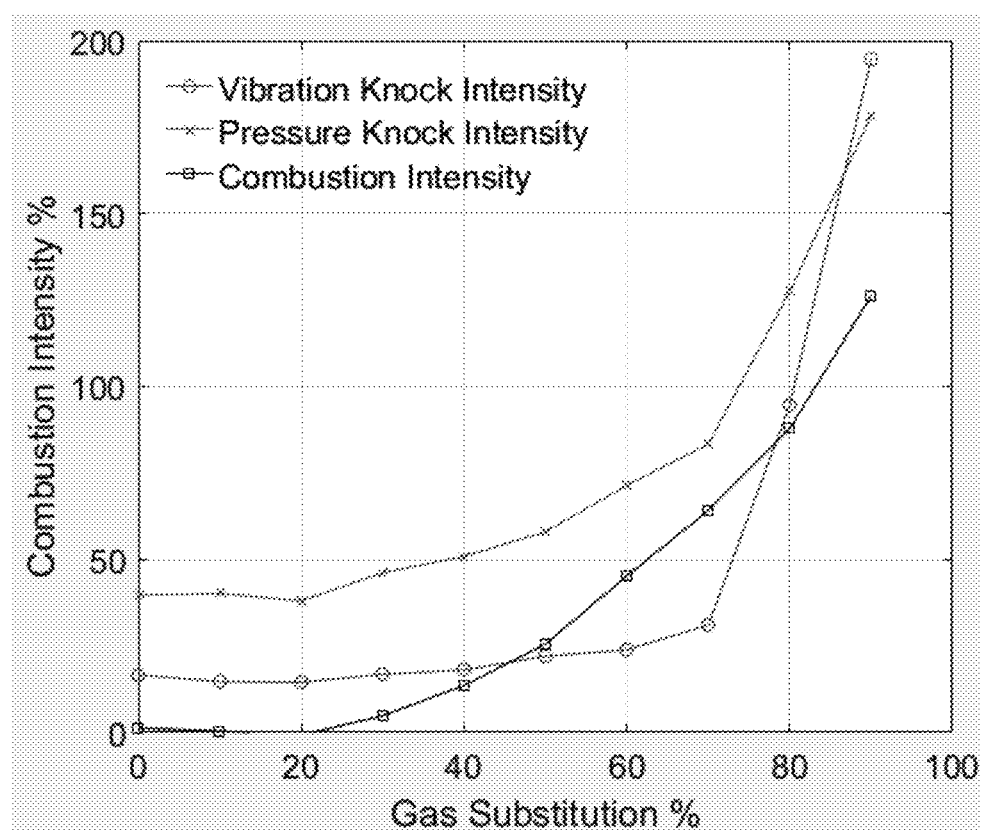
FIG. 12 is a plot of combustion intensity and knock intensity metrics versus gas substitution rate (GSR).

Increasing GSR leads to end-gas auto-ignition with large ripples in the pressure, as shown in pressure and heat release rate traces in FIGS. 10 and 11. Which show, plots of in-cylinder pressure at 0% (1001), 60% (1002) and 90% (1003) gas substitution rate versus crank angle, and smoothed heat release traces at 0% (1101), 60% (1102) and 90% (1003) gas substitution rate versus crank angle. FIG. 12 is a plot of combustion intensity and knock intensity metrics versus gas substitution rate (GSR), and shows that, when severe end-gas knock is present, both pressure and vibration knock intensity metrics increase sharply along with the combustion intensity. Therefore, it appears that the frequency based detection techniques, such as the spectral content in vibration or pressure ripple, are not clearly seen until intense knock occurs. At low loads, these vibration or pressure techniques fall short in clearly identifying the margin to knock as the trends were non-monotonic. If a simple threshold based severity is to be determined, this example shows that high threshold levels will only catch events of severe engine-damaging knock, which can occur abruptly. If lower threshold levels were used to quantify severity, then the engine should not be pushed past 50-60% gas substitution. In contrast, the present CI metric provides a continuously increasing measure of the state of combustion to provide better controllability and increase maximum safe gas substitution (e.g., up to 95% gas substitution), while improving protection against uncontrolled combustion.

Example 2

Figure 13:
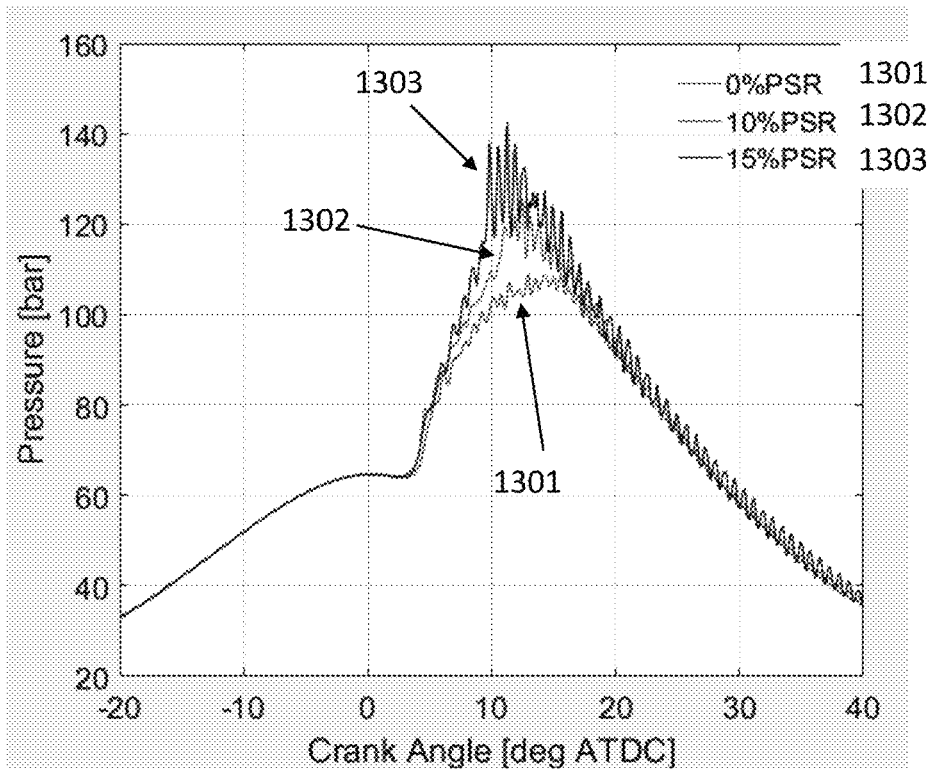
FIG. 13 is a plot of in-cylinder pressure traces at 0%, 10% and 15% propane gas substitution rate (PSR) at 80% GSR.
Figure 14:
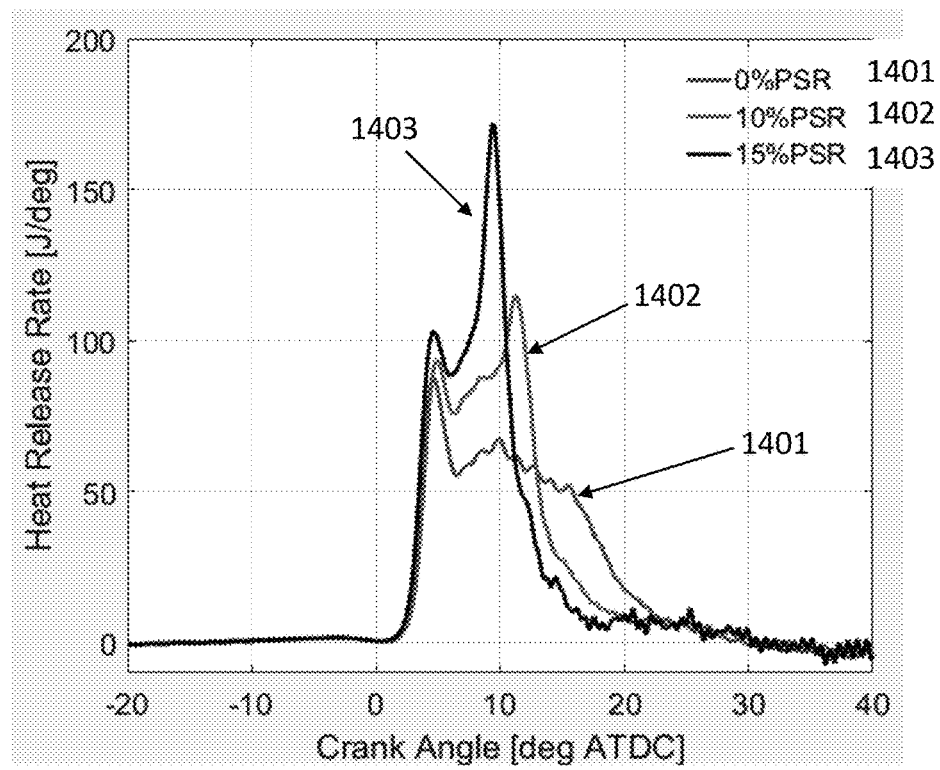
FIG. 14 is a plot of smoothed heat release traces at 0%, 10% and 15% propane gas substitution rate (PSR) at 80% GSR.
Figure 15:
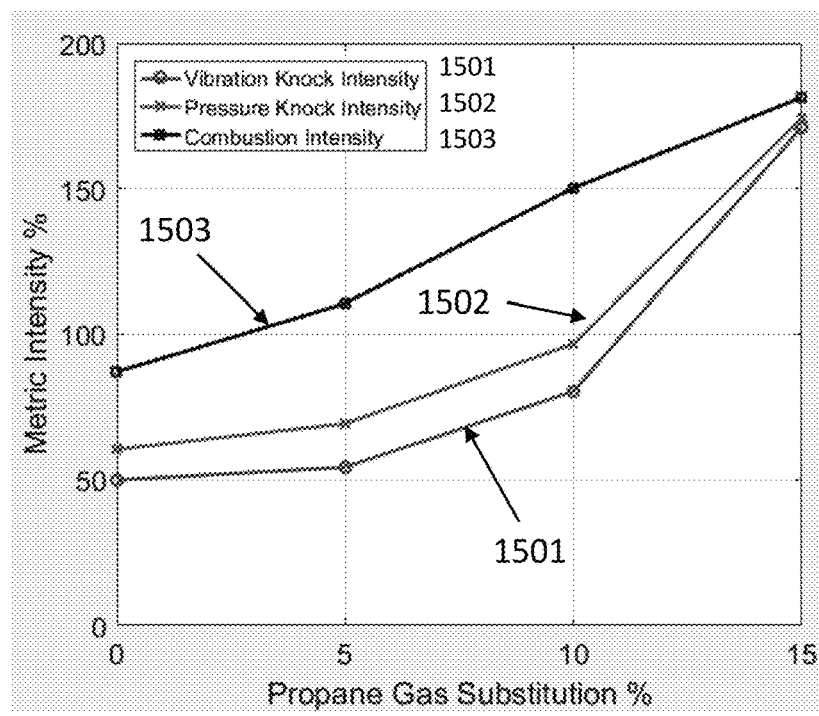
FIG. 15 is a plot of combustion intensity and knock intensity metrics versus propane gas substitution rate (PSR) at 90% GSR.

In Example, 2 the effect of gas quality was simulated by substituting propane in place of natural gas. FIGS. 13 and 14 show the pressure 1301, 1302, 1303 and smoothed heat release rate 1401, 1402, 1403 traces as the propane substitution ratio (PSR) was increased from 0% to 15% at 1800 rpm, 16 bar IMEP and at a fixed (overall) gas substitution of 80%. The diesel contribution in this test is maintained at 20%, while propane was substituted for natural gas in increments of 5% PSR using chemical energy split calculations. The plots indicate that even a small percentage of propane caused drastic heat release and pressure rise rates, with large, visible pressure oscillations. FIG. 15 is a graph of the CI (1503) and knock intensity metrics (1501, 1502) versus propane gas substitution rate (PSR) and shows that the CI metric is still reliable as propane was added to indicate the highly unstable combustion.

Figure 16:
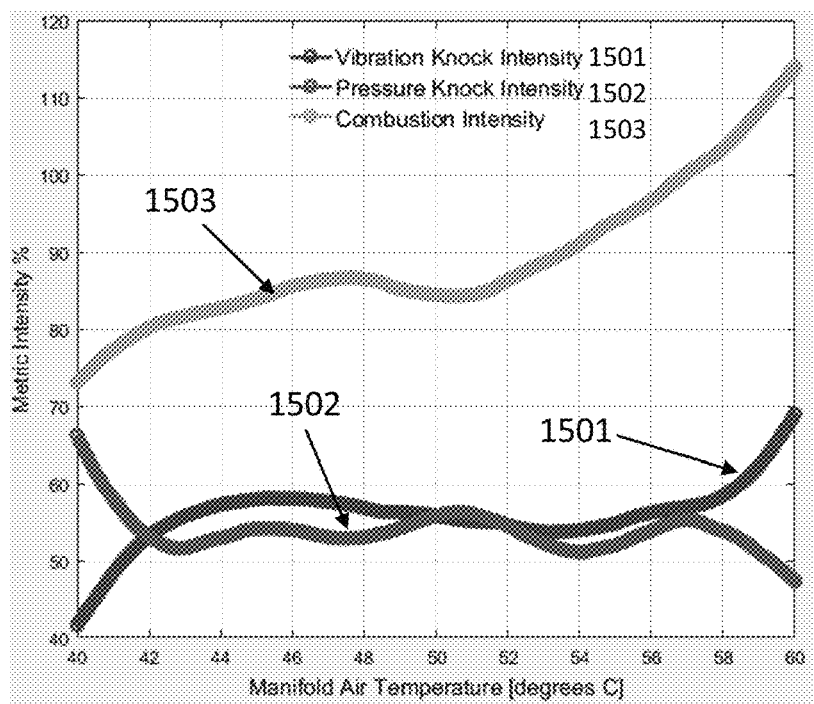
FIG. 16 is a plot combustion intensity and knock intensity metrics versus manifold air temperature (MAT).

FIG. 16 is a plot combustion intensity (1603) and knock intensity metrics (1601, 1601) versus manifold air temperature (MAT). FIG. 16 shows the effect of the charge air temperature or density on the detection of proximity to uncontrolled combustion. Increases in the charge air temperature can impact ignition delays, in-cylinder temperature rise rates and auto-ignition propensity of the engine. The metrics are compared as the manifold air temperature (MAT) is increased from 40° C. to 60° C., at 1800 rpm, 16 bar IMEP. The results indicate that only the CI metric increase linearly with the MAT, and can be used reliably as a proximity to uncontrolled combustion, whereas the other knock intensity metrics provide no clear trends.

Examples 3 and 4

Figure 17A:
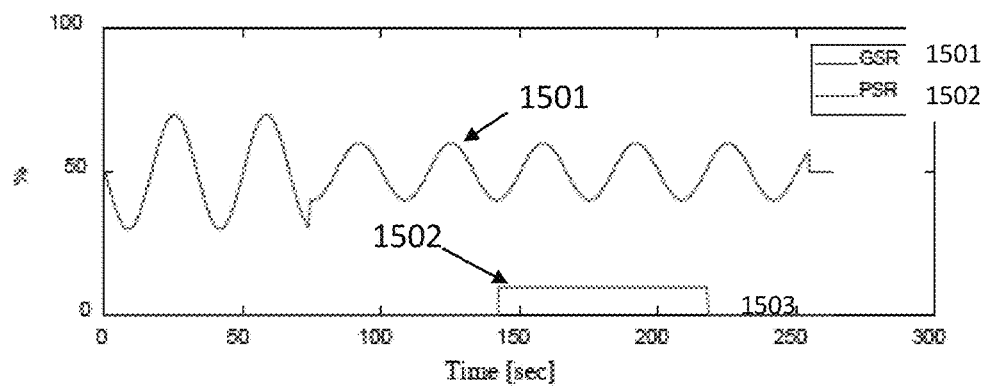
FIG. 17A is a plot of GSR and PSR versus time.
Figure 17B:
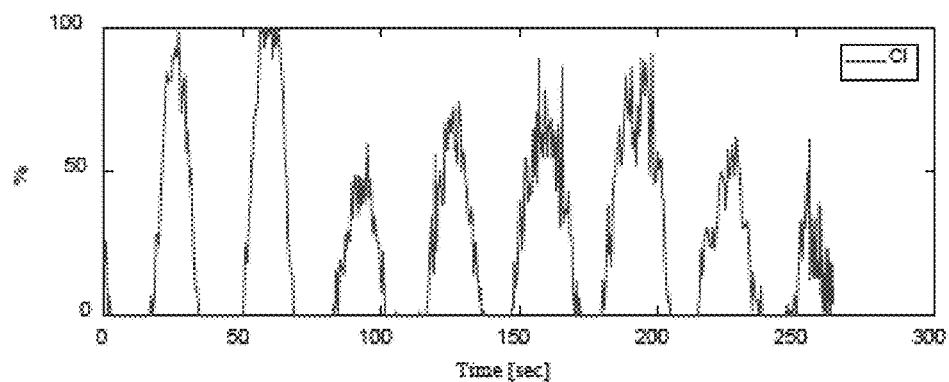
FIG. 17B is a plot of combustion intensity versus time during FIG. 17A, showing the effect of a sine wave GSR command with propane addition on the response of the CI metric.

A Woodward Large Engine Control Module (LECM) was used to test the CI metric on a real embedded ECU, which allowed for real-time combustion feedback to be performed using the AUX (Auxiliary) module. Two cases were tested to show the sensitivity of the CI metric to detect changes in combustion. FIGS. 17A and 17B show the first test case, where a sine wave was commanded for the GSR (1701) with an offset of 50% and an amplitude of 20%, as shown in FIG. 17A. FIG. 17B shows that the CI metric responded well to the changes as the metric went from 0% to 90% intensity. The amplitude was then decreased to 10%, and the CI metric showed 50% intensity at the peak. Then while the sine wave was still being commanded 10% propane (1702) was substituted for natural gas in order to simulate a gas quality change, and it can be seen that the CI metric (1701) detected the change by indicating a higher intensity.

Figure 18A:
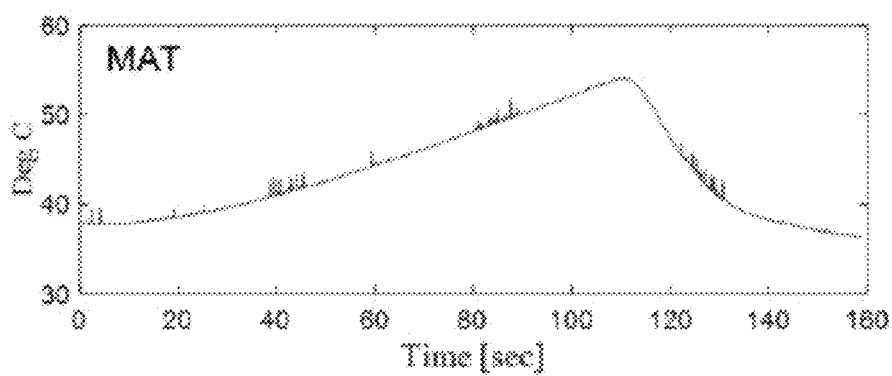
FIG. 18A is a plot of manifold air temperature (MAT) versus time.
Figure 18B:
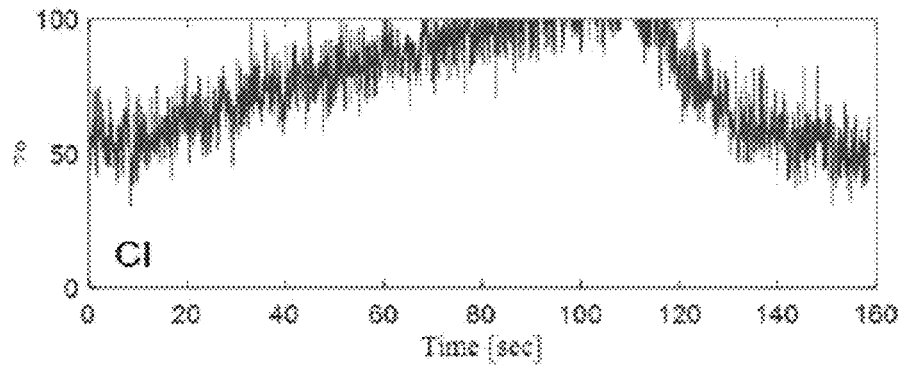
FIG. 18B is a plot of combustion intensity versus time for FIG. 18A, showing the effect of MAT on the response of the combustion intensity metric.

For the second case, the manifold air temperature (MAT) was allowed to increase to around 55° C. and then cooled quickly, as shown in FIG. 18A. FIG. 18B shows that the CI metric increased as MAT increased as expected. The results show that the CI metric detects external disturbances very well. In some instances, the CI metric is used to control the engine to a defined limit. The CI metric aspects disclosed herein can significantly reduces the amount of calibration as well as the amount of safety margin usually considered for dual fuel engines. This detection method should allow higher substitution rates to be achieved.

Figure 19:
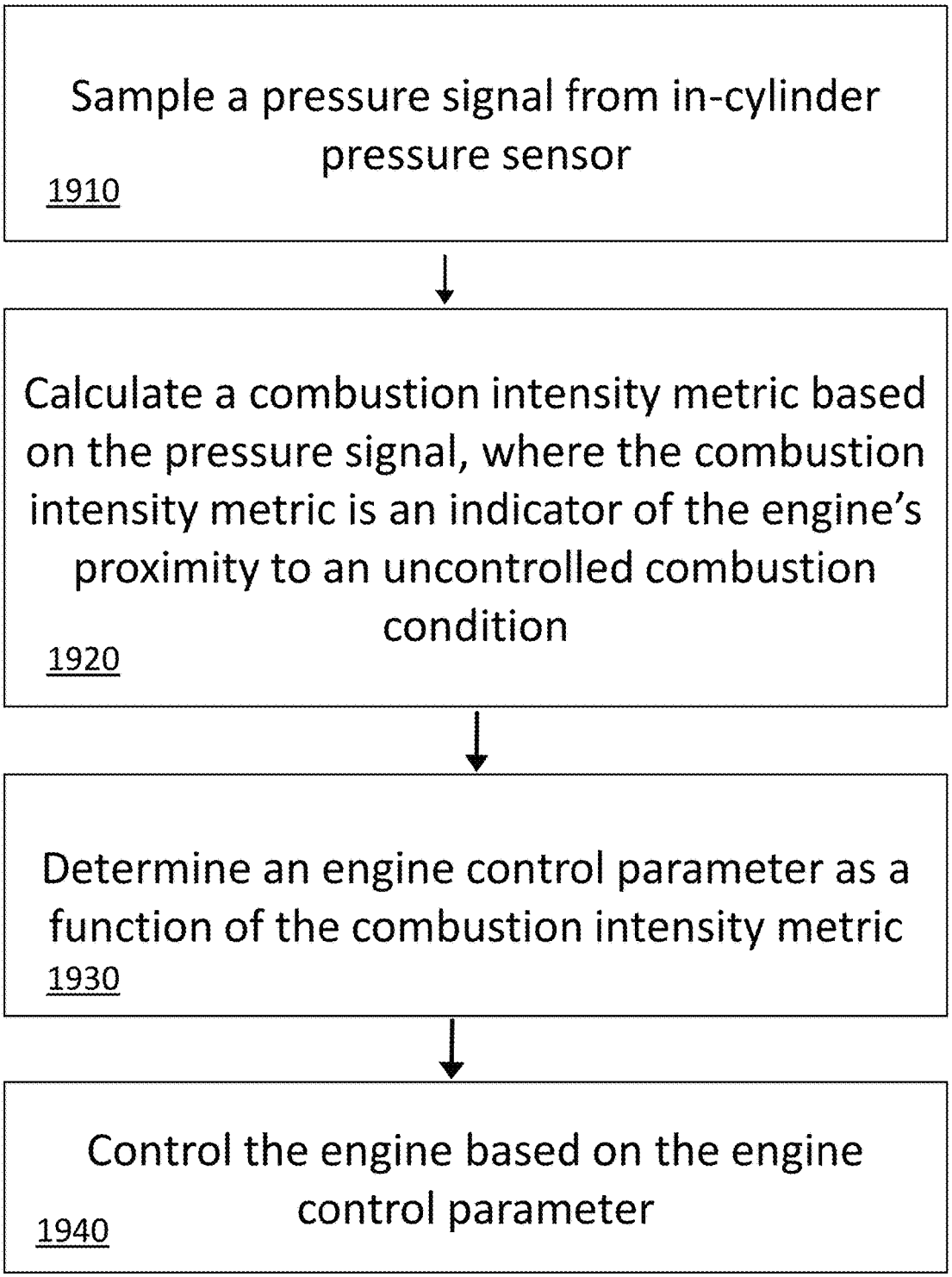
FIG. 19 is a flow chart of an example aspect of the present disclosure.

FIG. 19 is a flow chart 1900 of an example aspect of the present disclosure. A engine controller (e.g., ECU 102) sample a pressure signal from in-cylinder pressure sensor (1910), calculates a combustion intensity metric based on the pressure signal, where the combustion intensity metric is an indicator of the engine's proximity to an uncontrolled combustion condition (1920), determines an engine control parameter as a function of the combustion intensity metric (1930), and control the engine based on the engine control parameter (1940).

Implementations of the subject matter described in this specification, such as calculating a combustion intensity metric can be implemented as one or more computer program products, i.e., one or more modules of computer program instructions encoded on a tangible program carrier, for example a computer-readable medium, for execution by, or to control the operation of, a processing system. The computer readable medium can be a machine-readable storage device, a machine-readable storage substrate, a memory device, or a combination of one or more of them.

The term "engine control unit" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry.

Acronyms/Abbreviations:
ATDC=after top dead center
BTDC=before top dead center
CA50=location of 50% mass fraction burn (crank angle degrees ATDC)
CAN=controller area network
COV=coefficient of variation
ECU=engine control unit
EGR=exhaust gas recirculation
HCCI=homogeneous charge compression ignition
IMEP=indicated mean effective pressure (bar)
IVC=intake valve closing angle
LTC=low temperature combustion
MAP=manifold absolute pressure (bar)
MAT=manifold absolute temperature (K)
NOx=oxides of nitrogen
PCCI=premixed charge compression ignition
Ploc=location of peak pressure (crank angle degrees ATDC)
Pmax=maximum cylinder pressure (bar)
R&D=research and development
RCCI=reactivity controlled compression ignition
RPR=rate of pressure rise (bar/crank angle degree)
RT-CDC=real-time combustion diagnostics and control
SOC=start of combustion (crank angle degrees ATDC)

A number of embodiments have been described. Nevertheless, it will be understood that various modifications may be made. Accordingly, other embodiments are within the scope of the following claims.

What is claimed is:

1. A method of detecting uncontrolled combustion in an internal combustion engine, comprising:
    sampling a pressure signal from in-cylinder pressure sensor, the pressure signal representative of a measured pressure in a cylinder of the engine;
    calculating a combustion intensity metric based on the pressure signal, wherein the combustion intensity metric is an indicator of the engine's proximity to an uncontrolled combustion condition, where the combustion intensity metric is a function of at least a peak cylinder pressure, a rate of cylinder pressure rise, cylinder pressure ripple, burn duration, and a slope of heat release;
    determining an engine control parameter as a function of the combustion intensity metric; and
    controlling the engine based on the engine control parameter.

2. The method of claim 1, wherein the internal combustion engine comprises a dual-fuel internal combustion engine and wherein the engine control parameter comprises a substitution rate of a first fuel and a second fuel based on at least one of the engine control parameter or the combustion intensity metric.

3. The method of claim 2, wherein the first fuel is diesel and wherein the second fuel is natural gas.

4. The method of claim 1, wherein the combustion intensity metric is calculated within a same combustion cycle as the sampling of the in-cylinder pressure sensor.

5. The method of claim 1, comprising:
calculating, based on the pressure signal, a pressure metric, a heat release metric, and a knock metric, wherein the combustion intensity metric is a function of the pressure metric, the heat release metric, and the knock metric.

6. The method of claim 5, wherein the heat release metric comprises an adiabatic heat release rate of combustion in a cylinder of the engine.

7. The method of claim 1, comprising calculating at least one of the following combustion metrics based on the pressure signal:
the peak cylinder pressure;
the crank angle of peak cylinder pressure;
the rate of cylinder pressure rise;
the cylinder pressure ripple;
the crank angle of a cylinder pressure ripple;
the burn duration;
the slope of heat release;
the crank angle of centroid of heat release; or
the crank angle of max heat release rate.

8. The method of claim 7, wherein the combustion intensity metric is further a function of at least one of:
the crank angle of peak cylinder pressure;
the crank angle of cylinder ripple;
the crank angel of centroid of heat release; or
the crank angle of max heat release rate.

9. The method of claim 1, comprising determining a fuel input signal, a throttle position signal, and an ignition timing signal for the engine based on at least one of the combustion intensity metric or the engine control parameter.

10. A controller for controlling operation of a dual-fuel internal combustion engine of an engine system, the engine system comprising a pressure sensor configured to measure pressure in a cylinder of the engine and generate a corresponding pressure signal and a crank angle sensor configured to measure the crank angle of the engine and generate a corresponding crank angle signal, the controller comprising:
a processor couplable to the in-pressure sensor and the crank angle sensor; and
at least one non-transitory computer readable medium storing instructions operable to cause the processor of the controller to perform operations comprising:
(a) sample the pressure signal;
(b) calculate a combustion intensity metric based on the pressure signal, wherein the combustion intensity metric is an indicator of the engine's proximity to an uncontrolled combustion condition, and the combustion intensity metric is a function of at least a peak cylinder pressure, a rate of cylinder pressure rise, cylinder pressure ripple, burn duration, and a slope of heat release;
(c) determine a substitution rate of a first fuel and a second fuel delivered to the cylinder based on the combustion intensity metric; and
(d) control the dual-fuel internal combustion engine based on the substitution rate.

11. The controller of claim 10, wherein first fuel is diesel and wherein the second fuel is natural gas.

12. The controller of claim 10, wherein steps (b) and (c) occur within a next cycle of the cylinder.

13. The controller of claim 10, wherein the instructions include calculating, based on the pressure signal, a pressure metric, a heat release metric, and a knock metric, and wherein the combustion intensity metric is a function of the pressure metric, the heat release metric, and the knock metric.

14. The controller of claim 13, wherein calculating the heat release metric comprises calculating an adiabatic heat release rate of combustion in the cylinder of the engine.

15. The controller of claim 10, wherein the instructions include calculating at least one of the following combustion metrics based on the pressure signal:
the peak cylinder pressure;
the crank angle of peak cylinder pressure;
the rate of cylinder pressure rise;
the cylinder pressure ripple;
a location of cylinder pressure ripple;
the burn duration;
the slope of heat release;
the crank angle of centroid of heat release; or
the crank angle of max heat release rate.

16. The controller of claim 15, wherein the combustion intensity metric is further a function of at least one of:
the crank angle of peak cylinder pressure;
the crank angle of ripple;
the crank angle of centroid of heat release; or
the crank angle of max heat release rate.

17. The controller of claim 10, wherein the instructions include:
determine at least one of: a fuel input signal, a throttle position signal, or an ignition timing signal for the dual-fuel internal combustion engine based on at least one of the combustion intensity metric or the substitution rate, and
control the dual-fuel internal combustion engine using at least one of: the fuel input signal, the throttle position signal, or the ignition timing signal.

18. A controller for controlling operation of an internal combustion engine of an engine system, the engine system comprising a pressure sensor configured to measure pressure in a cylinder of the engine and generate a corresponding pressure signal and a crank angle sensor configured to measure the crank angle of the engine and generate a corresponding crank angle signal, the controller comprising:
a processor couplable to the in-pressure sensor and the crank angle sensor; and
at least one non-transitory computer readable medium storing instructions operable to cause the processor of the controller to perform operations comprising:
(a) sample the pressure signal;
(b) calculate a combustion intensity metric based on the pressure signal, wherein the combustion intensity metric is an indicator of the engine's proximity to an uncontrolled combustion condition, and the combustion intensity metric is a function of at least a peak cylinder pressure, a rate of cylinder pressure rise, cylinder pressure ripple, burn duration, and a slope of heat release;
(c) determine an engine control parameter as a function of the combustion intensity metric; and
(d) control the engine based on the engine control parameter.

* * * * *

UNITED STATES PATENT AND TRADEMARK OFFICE
CERTIFICATE OF CORRECTION

| | | |
|---|---|---|
| PATENT NO. | : 10,935,449 B2 | Page 1 of 1 |
| APPLICATION NO. | : 15/971957 | |
| DATED | : March 2, 2021 | |
| INVENTOR(S) | : Jason Barta et al. | |

It is certified that error appears in the above-identified patent and that said Letters Patent is hereby corrected as shown below:

In the Specification

In Column 3, Line 2, please delete "angel" and insert -- angle --

In Column 3, Line 57, please delete "angel" and insert -- angle --

In Column 12, Line 20, please delete "Index)" and insert -- Index). --

In Column 14, Line 52, please delete "6B" and insert -- 5B --

In the Claims

In Column 19, Line 26, Claim 8, please delete "angel" and insert -- angle --

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*